United States Patent Office 3,839,562
Patented Oct. 1, 1974

3,839,562
INSECTICIDAL PYRETHRINS IN COMBINATION WITH JUVENILE HORMONES
Madhukar Subraya Chodnekar, Basel, Albert Pfiffner, Pfaffhausen, Norbert Rigassi, Arlesheim, Ulrich Schwieter, Reinach, and Milos Suchy, Basel, Switzerland, assignors to Hoffmann-La Roche Inc., Nutley, N.J.
No Drawing. Filed Mar. 29, 1971, Ser. No. 129,202
Claims priority, application Switzerland, Mar. 31, 1970, 4,718/70
Int. Cl. A01n 9/08, 9/28
U.S. Cl. 424—187                     7 Claims

ABSTRACT OF THE DISCLOSURE

A composition for combatting insects having one component containing at least one juvenile hormone active compound and a second component containing at least one compound having insecticidal activity. The composition can be advantageously incorporated, in combination with inert carrier materials, into concentrates and ready-to-use pest control agents.

BACKGROUND OF THE INVENTION

It has been learned that many insecticides, especially the conventional insect poisons, particularly the carbamates, the pyrethrins, the chlorinated hydrocarbons and the phosphoric acid and the thiophosphoric esters, although highly lethal to numerous insects, cannot be used indiscriminately. Although useful for protecting foodstuffs feeds, textiles and plants, these insecticides tend to remain indefinitely in the environment after being used. These insecticides are not naturally degraded, and by remaining undegraded in the environment, their lingering residues tend to find their way into foods intended for human or cattle consumption. Moreover, because apparently many of these insecticides are not quantitatively degraded by mammalian organisms, the use of these insecticides can lead to the indirect injury of humans or other mammals. Thus, the decision to use many conventional insecticides cannot be made without some significant reservations.

There has been a need, therefore, for effective insecticides having a reduced tendency to linger in the environment, to contaminate food and to resist degradation in mammals.

SUMMARY OF THE INVENTION

To provide more effective insecticides which, at the same time, are less damaging to the environment, this invention relates to an insecticide composition comprising at least one insect poison and at least one compound having juvenile hormone-like activity. This insecticide composition can be combined with solid or liquid, inert carrier materials, to form a concentrate or a ready-to-use pest control agent. As a result, insecticidal compositions, concentrates and ready-to-use pest control agents are provided which are suitably effective against insects, although they contain only a fraction of the amount of insect poison of previous formulations, thereby reducing the production of lingering residues of such poisons in the environment.

DESCRIPTION OF THE PREFERRED EMBODIMENT

This invention relates to an insecticide composition (insecticide) comprising one or more insect-poisons and one or more compounds having juvenile hormone-like activity, which compounds will be hereinafter referred to as the "hormone-compounds."

As used throughout this application, the term "insect-poison" comprehends a compound or a combination of compounds which kill, disable or repel insects by either chemical or physical effects upon the insects systems. In the compositions of this invention, among the preferred insect-poisons are the carbamates, pyrethrins, chlorinated hydrocarbons, phosphoric acid esters, and thio-phosphoric acid esters.

Among the carbamates, especially preferred are the following:

1-naphthyl methylcarbamate (sevin);
m-(1-methylbutyl)-phenyl methylcarbamate;
m-(1-ethyl-propyl)-phenyl methylcarbamate;
3-methyl-5-isopropyl-phenyl methylcarbamate;
m-{[(dimethylamino)-methyl]-amino}-phenyl methylcarbamate; and
1-dimethylcarbamoyl-5-methyl-3-pyrazolyl dimethylcarbamate.

Among the pyrethrins, especially preferred are the following:

pyrethrum, particularly pyrethrin I and II and cinerin I and II;
2,2-dimethyl-3-(2-methylpropenyl)-cyclopropanecarboxylic acid 1-cyclohexene-1,2-dicarboximido-methyl ester;
2,2-dimethyl-3-(2-methylpropenyl)-cyclopropanecarboxylic acid 5-benzyl-3-furyl-methyl ester; and
2-allyl-4-hydroxy-3-methyl-2-cyclopenten-1-one esterified with a mixture of cis and trans 2,2-dimethyl-3-(2-methylpropenyl)-cyclopropanecarboxylic acid (allethrin).

Among the halogenated hydrocarbons, especially preferred are the following:

1,2,3,4,10,10-hexachloro-1,4,4a,5,8,8a-hexahydro-1,4-endo-exo-5,8-dimethano-naphthalene;
octachloro-camphor;
1,1,1-trichloro-2,2-bis-(p-chlorophenyl)-ethane;
1,2,3,4,10,10-hexachloro-6,7-epoxy-1,4,4a,5,6,7,8,8a-octahydro-1,4-endo-endo-5,8-dimethano-naphthalene;
1,2,3,5,6,7,8,8-octachloro-2,3,3a,4,7,7a-hexahydro-4,7-methano-indene;
1,4,5,6,7,8,8-heptachloro-3a,4,7,7a-tetrahydro-4,7-endomethano-indene;
1,1,1-trichloro-2,2-bis-(p-methoxyphenyl)-ethane (methoxychloro);
hexachloro-cyclohexane;
1,2,3,4,10,10-hexachloro-6,7-epoxy-1,4,4a,5,6,7,8,8a-octahydro-1,4-endo-exo-5,8-dimethano-naphthalene;
1,1,1-trichloro-2,2-bis(p-chlorophenyl)-ethanol (kelthane);
1,1-dichloro-2,2-bis-(p-ethylphenyl)-ethane;
1,1-dichloro-2,2-bis-(p-chlorophenyl)-ethane;
1,2-dibromo-3-chloro-propane;
1,2-dibromo-ethane; and
methyl bromide.

Among the phosphoric acid esters, especially preferred are the following:

2-carbomethoxy-1-prop-2-enyl dimethyl phosphate;
1,2-dibromo-2,2-dichloroethyl dimethyl phosphate;
1-chloro-diethylcarbamoyl-1-prop-2-enyl dimethyl phosphate;
tetraethyl pyrophosphate;
tetra-N-propyl dithiono-pyrophosphate;
O,O-dimethyl-O-2,2-dichlorovinyl-phosphate;
O,O-dimethyl-O-[1-methyl-2-(1 - phenyl - carbethoxy)-vinyl]-phosphate; and
O,O-dimethyl-(1-hydroxy - 2,2,2 - trichloroethyl) - phosphonate.

Among the thiophosphoric acid esters, especially preferred are the following:

S-[1,2-bis-(carbethoxy - ethyl] - O,O - dimethyl - dithiophosphate malathion);
O,O-diethyl-O-(2-isopropyl - 4 - methyl - 6 - pyrimidyl)-thiophosphate;
O,O-dimethyl-O-(p-nitrophenyl)-thiophosphate;
O,O-diethyl-O-(p-nitrophenyl)-thiophosphate;
O,O-dimethyl-S-[4 - oxo - 1,2,3 - benzotriazin - 3 - (4H)-yl-ethyl]-dithiophosphate;
O,O-diethyl-S-(2-ethylthio)-ethyl-dithiophosphate;
O,O-dimethyl-S-(2-ethylthio)-ethyl-thiophosphate;
O,O-dimethyl-O-(2-ethylthio)-ethyl-thiophosphate;
O,O-diethyl-S-(2,5-dichlorophenyl - thiomethyl) - dithiophosphate;
O,O-dimethyl-S-(N-methylcarbamoyl - methyl) - dithiophosphate;
2,3-p-dioxandithio S,S'-bis-(O,O-diethyl-dithiophosphate);
O,O,O',O'-tetraethyl-S,S' - methylene - bis - (dithiophosphate; and
S-{[(p-chlorophenyl)-thio]-methyl}-O,O - diethyl - dithiophosphate.

Among other preferred insect-poisons, especially preferred are the following:

N,N-dimethyl-N'-(2-methyl - 4 - chlorophenyl) - formamidine;
2-(p-tert.butylphenoxy) - isopropyl 2 - chloroethyl sulphite;
p-chlorophenyl 2,4,5-trichlorophenyl sulphone;
6,7,8,9,10,10-hexachloro-1,5,5a,6,9,9a - hexahydro - 6,9-methano-2,4,3-benzodioxathiepine 3-oxide;
N-(1,1,2,2-tetrachloroethyl-sulphinyl)-cyclohex - 4 - ene-1,2-dicarboximide;
2-dodecanoic acid 2-thiocyanato-ethyl ester;
crotonic acid 2-(1-methyl-heptyl)-4,6-dinitro-phenyl ester;
N-trichloro-methylthio-cyclohex-4-ene-1,2-dicarboximide;
N-trichloro-methylthio-phthalimide;
3,4-methylenedioxy-6-propy-benzyl butyl diethylene glycol ether; and
rotenone.

Among the especially preferred insect-poisons, above, particularly preferred are the pyrethrins.

As also used herein, the term "compounds having juvenile hormone-like activity" or "hormone-compounds," comprehends compounds which behave as juvenile hormones, interfering with insects hormonal systems, causing their transformation to the imago, their laying of viable eggs and the development of their eggs to be disrupted. These disruptions, which are the characteristics of juvenile hormone activity, effectively prevent affected insects from maturing and proliferating.

The preferred hormone-compounds of this invention are the saturated and unsaturated monoterpenoids and sesquiterpenoid esters or ethers, which may be unsubstituted by halogen, hydroxy, and/or an O or S bridge. These hormone-compounds may be all cis or all trans isomers or mixtures thereof. Especially preferred are the hormone-compounds of the formula:

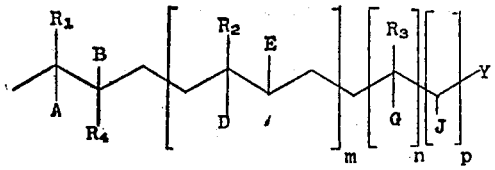

wherein $R_1$ and $R_2$ are methyl or ethyl; $R_3$ and $R_4$ are hydrogen or methyl; B, E, G, and J are individually hydrogen and A and D are individually hydrogen or halogen or A and B taken together form a carbon to carbon bond or an O or S bridge, D and E taken together form a carbon to carbon bond and G and H taken together form a carbon to carbon bond; Y is —COOR, —CH₂O—R',

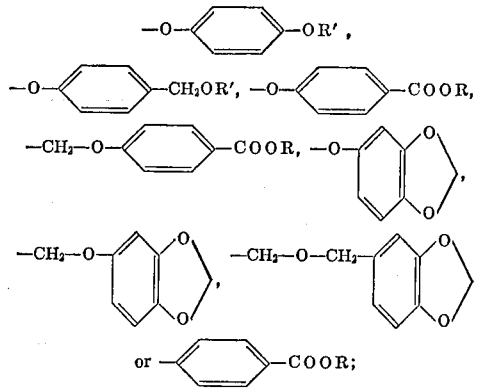

R is hydrogen, lower alkyl, lower alkenyl or lower alkynyl; R' is lower alkyl, lower alkenyl or lower alkynyl; and $m$, $n$ and $p$ are integers from 0 to 1.

In preferred compounds of formula I, A and B taken together form an oxygen bridge; A and D are halogen; Y is

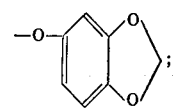

and/or R or R' is lower alkynyl. Among these, the particularly preferred compounds of formula I include the following:

7,11-dichloro-3,7,11-trimethyl-dodec - 2 - enoic acid ethyl ester.
10,11-epoxy-7-ethyl-3,11-dimethyl-trideca-2,6-dienoic acid methyl ester;
10,11-epoxy-3,7,11-trimethyl-dodeca-2,6-dienyl ethyl ester;
10,11-epoxy-3,7,11-trimethyl-dodeca-2,6-dienoic acid ethyl ester;
p-[(1,5-dimethyl-hexyl)-oxy]-benzoic acid methyl ester;
6,7-epoxy-3,7-dimethyl-1-[(3,4 - methylenedioxy) - phenoxy]-oct-2-ene;
10,11-epoxy-3,7,10,11-tetramethyl-dodeca-2,6-dienoic acid ethyl ester;
10,11-epoxy-3,7,11-trimethyl-trideca-2,6-dienoic acid ethyl ester;
6,7-epoxy-3,7-dimethyl-1-(2-propynyloxy)-oct-2-ene;
10,11-epoxy-7-ethyl-3,11-dimethyl - trideca - 2,6 - dienoic acid ethyl ester;
2-methyl-6-[(3,4-methylenedioxy)-phenoxy]-hept-2-ene;
3-methyl-7-[(3,4-methylenedioxy)-phenoxy]-oct-3-ene;
4-methyl-1-[(3,4-methylenedioxy)-phenoxy]-hex-3-ene;
2-methyl-6-[(3,4-methylenedioxy)-benzyloxy]-heptane;
2-methyl-6-[(3,4-methylenedioxy)-phenoxy]-heptane;
6-methyl-2-[(3,4-methylenedioxy)-phenoxy]-octane;
4-methyl-1-[(3,4-methylenedioxy)-phenoxy]-hexane;
2,3-epoxy-2-methyl-6-[(3,4 - methylenedioxy) - phenoxy]-heptane;
5,6-epoxy-6-methyl-2-[(3,4-methylenedioxy) - phenoxy]-octane;
3,4-epoxy-4-methyl-1-[(3,4 - methylenedioxy) -phenoxy]-hexane;
1-[(1,5-dimethyl-hexyl)-oxy]-4-(2 - propynyloxy) - benzene;
p-[(1,5-dimethyl-hexyl)-oxy] - benzoic acid 2 - propynyl ester;
p-[(1,5-dimethyl-hexyl)-oxy]-α-2-propynyloxy-toluene;
p-[(1,5-dimethyl-hex-4-enyl)-oxy] - benzoic acid 2 - propynyl ester;
p-[(4,5-epoxy-1,5-dimethyl-hexyl)-oxy] - benzoic acid 2-propynyl ester; and
p-[(3,7,11-trimethyl-dodeca-2,6,10-trien) - oxy] - benzoic acid 2-propynyl ester.

Also, in preferred compounds of formula I, A and B taken together and/or D and E taken together form a carbon-to-carbon bond. Among these, the particularly preferred compounds of formula I include the following:

3,7,11-trimethyl-2,4,10-dodecatrienoic acid ethyl ester;
10,11-epoxy-3,7,11-trimethyl-2,4-dodecadienoic acid ethyl ester;
3,7,11-trimethyl-2,4,10-dodecatrienoic acid propargyl ester;
10,11-epoxy-3,7,11-trimethyl-2,4-dodecadienoic acid propargyl ester;
3,7,11-trimethyl-2,4,10-dodecatrienylpropargyl ether; and
10,11-epoxy-3,7,11-trimethyl-2,4-dodecadienylpropargyl ether.

Among the particularly preferred hormone-compounds of formula I, among the quite particularly preferred are the following:

trans 7,11-dichloro-3,7,11-trimethyl-dodec-2-enoic acid ethyl ester;
10,11-epoxy-7-ethyl-3,11-dimethyl-trideca-2,6-dienoic acid methyl ester;
10,11-epoxy-3,7,11-trimethyl-dodeca-2-cis/trans-6-dienyl ethyl ester;
10,11-epoxy-3,7,11-trimethyl-dodeca-2,6-trans-dienoic acid ethyl ester;
p-[(1,5-dimethyl-hexyl)-oxy]-benzoic acid methyl ester;
6,7-epoxy-3,7-dimethyl-1-[(3,4-methylenedioxy)-phenoxy]-oct-2-bis/trans-ene;
10,11-epoxy-3,7,10,11-tetramethyl-dodeca-2-cis/trans-6-cis/trans-dienoic acid ethyl ester;
10,11-epoxy-3,7,11-trimethyl-trideca-2,6-dienoic acid ethyl ester;
6,7-epoxy-3,7-dimethyl-1-(2-propynyloxy)-oct-2-cis/trans-ene; and
10,11-epoxy-7-ethyl-3,7-dimethyl-trideca-2,6-dienoic acid ethyl ester.

Especially preferred hormone-compounds are also the compounds of the formula:

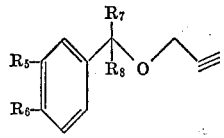

IIa wherein $R_5$ and $R_6$ are individually lower alkyl, lower alkoxy, halogen, propynyloxy or, taken together, lower alkylenedioxy and $R_7$ and $R_8$ are hydrogen or lower alkyl.

Among the preferred compounds of formula IIa are:

6-[(2-propynyloxy)methyl]-1,4-benzodioxane;
3,4-dihydro-7-[(2-propynyloxy)methyl]-2H-1,5-benzodioxepine;
3,4-(methylenedioxy)-α-(propynyloxy)toluene;
3,4-dimethoxy-α-(2-propynyloxy)toluene;
1,2-dimethoxy-4-[1-(2-propynyloxy)propyl]benzene;
3,4-dihydro-7-[1-(2-propynyloxy)propyl]-2H-1,5-benzodioxepine;
6-[1-(2-propynyloxy)propyl]-1,4-benzodioxane;
1,2-methylenedioxy-4-[1-(2-propynyloxy)propyl]benzene; and
(α,α-diethylpiperonyl)-propynyl ether.

Especially preferred hormone-compounds are further the compound of the formula:

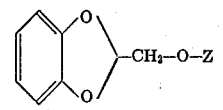

IIb wherein Z is —CH$_2$—C≡CH or

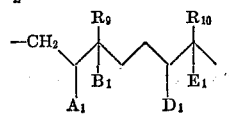

wherein $R_9$ and $R_{10}$ are methyl or ethyl and $A_1$, $B_1$, $D_1$ and $E_1$ are individually hydrogen or $A_1$ and $B_1$ taken together are a carbon to carbon bond and $D_1$ and $E_1$ taken together are a carbon to carbon bond.

Among the preferred compounds of formula IIb are:

2-[(2-propynyloxy)methyl]-1,4-benzodioxane;
2-{[(3,7-dimethyl-2,6-octadienyl)oxy]methyl}-1,4-benzodioxane; and
2-{[(3,7-dimethyloctyl)oxy]methyl}-1,4-benzodioxane.

As used throughout this application, the term "halogen" or "halo," when not expressly stated otherwise, includes all four halogens, i.e., fluorine, chlorine, bromine and iodine. As used herein, the term "alkali metal" includes the metals of the first main group of the periodic chart, e.g., lithium, sodium and potassium. As also used herein, the term "lower alkyl" comprehends both straight-chain and branched-chain saturated alkyl hydrocarbon groups containing from 1 to 6 carbon atoms, such as methyl, ethyl, propyl and isopropyl, with methyl and ethyl being preferred. The term "lower alkoxy," as used herein, comprehends lower alkoxy groups containing from 1 to 6 carbon atoms such as methoxy, ethoxy and propoxy, with methoxy and ethoxy being preferred. The term "lower alkenyl," as used herein, includes both straight-chain and branched-chain unsaturated alkenyl hydrocarbon groups having from 2 to 6 carbon atoms such as vinyl, allyl, butenyl and pentenyl, with allyl being preferred. The term "lower alkynyl" as used herein includes both straight-chain and branched-chain, acetylenically unsaturated hydrocarbon groups having from 2–6 carbon atoms such as ethynyl, propargyl and butynyl, with propargyl being preferred. The term "lower alkylenedioxy" as used herein comprehends lower alkylenedioxy groups containing 1–4 carbon atoms, such as methylenedioxy and ethylenedioxy, with groups containing 1–3 carbon atoms being preferred.

The proportions of the two components of the synergistic insecticide composition, in accordance with this invention, vary within wide limits according to the purpose of use, the mode of application, the pests to be controlled and other factors. Any ratio of the insect-poison and the hormone-compound can be utilized. However, it is preferred to use approximately one to ten parts by weight of hormone-compound and approximately one to ten parts by weight of insect-poison, with about equal parts by weight of the two components being especially preferred.

Pest control agents containing the insecticide composition in accordance with this invention can be prepared in the form of granulates, concentrates or ready-to-use pest control agents. The concentration of the insecticide composition depends upon the form of pest control agent and the mode of use. The pest-control agents in accordance with this invention can contain solid or liquid inert carrier materials to form solutions, sprays, aerosols or dusting powders. For these pest-control agents, it may be advantageous for the insecticide composition to be in the form of an emulsion, a suspension, or a solution with the carrier material and to further include emulsifying and/or wetting agents. Solutions of the insecticide composition, suitable as sprays for a material to be protected can be prepared by dissolving or dispersing the insecticide composition in a liquid solvent such as: mineral oil fractions, cold tar oils, oils of vegetable or animal origins, hydrocarbons, such as naphthanes, ketones, such as methyl ethyl ketone, or chlorinated hydrocarbons such as tetrachloroethylene, tetrachlorobenzene, and the like. Suitable dusting powders can be obtained by combining the insecticide composition with solid carrier materials such as: chalk, talc, bentonite, kaolin, diatomaceous salt, siliceous earth, fullers earth, lime, gypsum, powders and meals from organic waste products, etc.

In general, the pest-control agents utilizing the insecticide compositions of the present invention can be prepared according to a process such as is described, for example, in Farm Chemicals, Volume 128, pages 52 ff. The pest-control agents in accordance with this invention can additionally utilize yet other additives such as emulsifiers or masking agents.

The pest-control agents in accordance with this invention can exist in the form of concentrates which are suitable for storage and transport. Such concentrates can, for example, contain 40–80% by weight of the synergistically active combination of insect-poison and hormone-compound as the active substance and 60–20% by weight of an inert carrier material. In preparing these concentrates, any conventional, liquid, or solid inert carrier material can be utilized. Among the inert carrier materials which can be utilized are the liquid solvents and solid materials mentioned above.

These concentrates can be further diluted with similar or different carrier materials to concentrations which are suitable for practical use as ready-to-use pest-control agents. In the ready-to-use agents, the active substance concentration is preferably 0.1–20 weight percent of the synergistically active substance and 99.9–80 weight percent of an inert carrier material, with .1–10 weight percent of the active substance and 99.9–90 weight percent of the inert carrier being especially preferred. The active substance concentration can also be smaller or larger than the preferred concentration. In preparing these ready-to-use pest-control agents, any conventional liquid or solid carrier material may be utilized. Among the inert carrier materials which may be utilized are the liquid and solid materials above.

The conventional, inert carrier materials utilized in combination with the insecticides of this invention are substances which are used to dissolve, disperse or diffuse the hormone-compounds and the insect-poisons components of the insecticide without impairing their individual effectiveness or their synergism. In addition, these carrier materials do not permanently damage the environment to which they are applied (e.g., crops, soil, equipment, etc.). Preferably, the carrier materials are also water immiscible, aromatic hydrocarbons and ketones being the preferred liquid solvents set forth above.

The ready-to-use pest-control agents of this invention may be advantageously applied to certain plants, foodstuffs, textiles and the like. Of course, due precautions must be observed in the use of these agents due to the toxic effects of the insect-poison portion of these agents upon mammals. An effective amount of the pest-control agent can be applied to an insect-infested area using any conventionally accepted method such as spraying, dusting, etc. The choice of the concentration of the insecticide composition in the pest-control agent and the rate of application to the insect-infested area will, of course, depend on several factors, for example, the type and maturity of insects present, the type of pest-control agent and the mode of application. Generally, in combatting insects, the insecticide composition of this invention can be advantageously applied to the material to be protected in concentrations of about $10^{-3}$ to $10^{-6}$ g./cm.$^2$ of the material to be protected, preferably $10^{-4}$ to $10^{-5}$ g./cm.$^2$.

In accordance with this invention, it has been surprisingly found that the activity of customary insect-poisons is advantageously increased by a factor of approximately two to ten and more by combining these poisons with compounds having juvenile hormone-like activity, including an ovicidal and/or sterilant activity. By the synergistic combination of insecticides of this invention, it is now possible to achieve the same insecticidal activity, formerly obtainable using either insect-poisons or hormone-compounds alone, with 10–50% of the previous amount of insect-poison used. Thereby the undesirable lingering residue of insect-poisons to which the environment tends to be exposed is substantially reduced.

This insecticide combination has an additional advantage, i.e., after the action of the insect-poison has subsided, the juvenile hormone action of the hormone-compound comes to the fore, so that the sequence of generations is interrupted and the pests are indirectly killed. The juvenile hormone activity also disturbs the subsequent rebuilding of the insect population so that less frequent spraying of the insecticide agents of this invention is possible, thereby reducing the amounts of residual poisons to which the environment is exposed.

In addition, the hormone-compounds are practically nonpoisonous to vertebrate animals. Their toxicity lies at over 1000 mg./kg. body weight, and they are readily degraded. The risk of their accumulation is therefore excluded.

The pest-control agents in accordance with the invention can be employed against pests according to the usual methods, such as, for example, by means of contact or by intake with the food. The agents are active against arthropods and nematodes, especially against the most varied insects, such as the following: Diptera, such as house flies, fruit flies, (Drosophila malanogaster), midges and stable flies; Lepidoptera such as cabbage moth (Trichoplusia ni), bud-roller, lazy silk worm moth, noctuid moths, and moth caterpillars; and Coleoptera, such as lucern leaf borer (Hypera postica), confused flour beetle (Tribolium confusum), aphids, colorado beetle, spider mites and Prodenia litura.

The especially preferred monoterpenoid and sesquiterpenoid compounds of formula I of the hormone-compounds of the insecticide composition of this invention are obtained by reacting a compound of the formula:

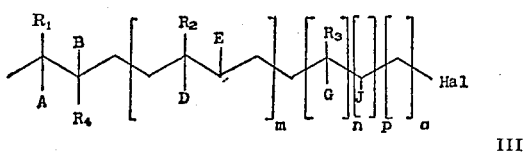

III wherein $R_1$, $R_2$, $R_3$, $R_4$, A, B, D, E, G, J, $m$, $n$ and $p$ are as above; $q$ is an integer of from 0 to 1 and Hal is a halogen;
with a compound of the formula:

$$M-Y' \qquad\qquad IV$$

wherein M is an alkali metal; Y' is —O—R''

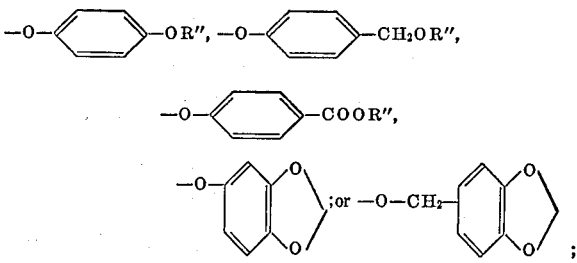

wherein R'' is hydrogen, lower alkyl, lower alkenyl, or lower alkynyl; to form a compound of the formula:

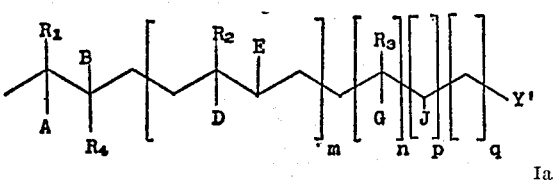

Ia wherein $R_1$, $R_2$, $R_3$, $R_4$, A, B, D, E, G, J, $m$, $n$, $p$, $q$, and Y' are as above.

The especially preferred hormone-compounds of formula I are also obtained by reacting a compound of the formula:

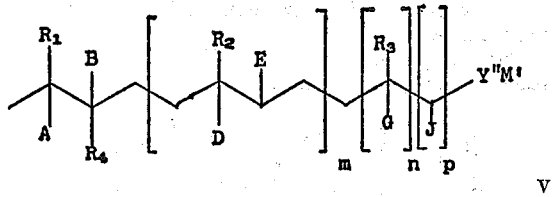

wherein $R_1$, $R_2$, $R_3$, $R_4$, A, B, D, E, G, J, m, n and p are as above M' is an alkali metal and Y'''M' is —COO—M', —CH$_2$O—M'

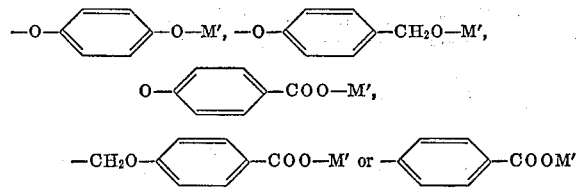

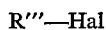

with a compound of the formula:

$$R'''—Hal \qquad VI$$

wherein Hal is as above and R''' is lower alkyl, lower alkenyl or lower alkynyl; to form a compound of the formula:

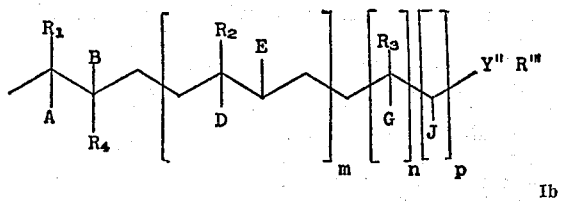

wherein $R_1$, $R_2$, $R_3$, $R_4$, A, B, D, E, G, J, m, n, p, Y'' and R''' are as above.

The especially preferred hormone-compounds, of formula I, are further obtained by reacting a compound of the formula:

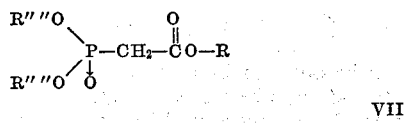

wherein R is as above and R'''' is lower alkyl, phenyl, halophenyl or loweralkoxyphenyl; with a compound of the formula:

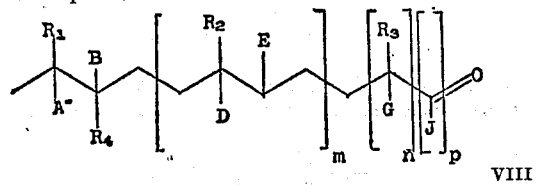

wherein $R_1$, $R_2$, $R_3$, $R_4$, A, B, D, E, G, J, m, n and p are as above, to form a compound of the formula:

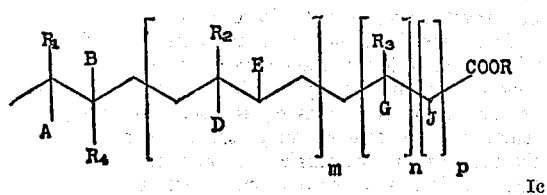

wherein A, B, D, E, G, J, $R_1$, $R_2$, $R_3$, R, $R_4$, m, n and p are as above.

The especially preferred monoterpenoid and sesquiterpenoid compound of formula IIa of the hormone-compounds of the insecticide of this invention are obtained by reacting a compound of the formula:

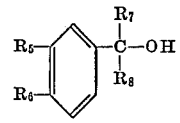

wherein $R_5$, $R_6$, $R_7$ and $R_8$ are as above; with a compound of the formula:

$$CH\equiv CCH_2—Hal' \qquad X$$

wherein Hal' is chlorine, bromine or iodine.

In the compounds of formulas I, Ia, Ib or Ic wherein A and B taken together form a carbon to carbon bond, these compounds can be epoxidized to a compound of formula I wherein A and B taken together form an oxygen bridge. These epoxidized compounds can be episulphidized to a compound wherein A and B taken together form a sulfur bridge. The unsaturated compounds of formulas I, Ia, Ib or Ic can also be hydrogenated to a compound wherein A and B are individually hydrogen.

One method for preparing the compounds of formula I involves reacting, in a well known manner, a halide compound of formula III with an alkali metal salt of formula IV. This reaction is suitably conducted in an inert solvent, preferably in the presence of an aprotonic solvent. In carrying out this reaction, any conventional inert organic solvent can be utilized, with benzene, toluene, dioxane, 1,2-dimethoxymethane and tetrahydrofuran being preferred and tetrahydrofuran being especially preferred. In this reaction, any conventional aprotonic solvent can be utilized, with hexamethyl phosphoric acid triamide being preferred. In this reaction, temperature and pressure are not critcial, and the reaction can be suitably carried out in a temperature range of 0° C. to the boiling point of the reaction mixture. In a preferred embodiment of this reaction, the reaction is carried out at ca 70° C., the reflux temperature of the especially preferred solvent.

Another method for preparing the compounds of formula I involves reacting, in a well known manner, the alkali metal salt of formula V with the halide of formula VI. This reaction is also suitably carried out in an inert solvent, preferably in the presence of an aprotonic solvent. In carrying out this reaction, any conventional inert organic solvent can be utilized, with benzene, toluene, dioxane, 1,2-dimethoxymethane and tetrahydrofuran being preferred and tetrahydrofuran being especially preferred. In this reaction, any conventional aprotonic solvent may be utilized, with hexamethyl phosphoric acid triamide being preferred. In this reaction, temperature and pressure are not critical, and the reaction can be suitably carried out in a temperature range of 0° C. to the boiling point of the reaction mixture. In a preferred embodiment of this reaction, as in the above reaction, the preferred temperature is ca 70° C.

The reaction mixtures from the reactions of either a compound of formula III with a compound of formula IV or a compound of the formula V with a compound of formula VI can be worked up in a conventional manner to obtain the compounds of formula I. A preferred method of working up includes: pouring the reaction mixture onto ice; extracting the compound of formula I with a conventional inert organic solvent, preferably diethyl ether; washing the solvent extract with water; drying the solvent and evaporating the solvent. The residual compound of formula I can be further purified by adsorption, preferably on Kieselgel or almuinum oxide.

A still further method for preparing a compound of formula I of the instant invention involves reacting a carbonyl compound of formula VIII with a phosphine oxide of formula VII. Although temperature and pressure are not critical, this reaction is preferably effected in a temperature range of 0° C. to about 40° C. The reaction is carried out in the presence of a base and in an inert organic solvent. Any conventional base and inert organic solvent can be utilized in this reaction. The preferred bases are, however, the alkali metal hydrides, such as sodium hydride, preferably dissolved in benzene, toluene, dimethylformamide, tetrahydrofuran, dioxane or 1,2-dimethoxyethane and the alkali metal alcoholates, such as sodium methylate, preferably dissolved in an alcohol, such as methanol. In a particularly prefered reaction, a compound of formula VIII is reacted with a phosphorine oxide of formula VII in the presence of 2 moles of sodium hydride in absolute tetrahydrofuran, excess sodium being decomposed by adding absolute alkanol prior to the working up.

The compounds of formula II are obtained, in a well known manner, by reacting the compound of formula IX with the compound of formula X in an inert organic solvent in the presence of a strong base. In carrying out this reaction, any conventional inert organic solvent can be utilized, with dimethylformamide, dioxane or hexamethyl phosphoric acid triamide being preferred. In this reaction, any conventional strong base can be utilized, with the alkali metals, alkali metal hydrides, and the alkali metal amides being preferred, sodium being the preferred alkali metal. In carrying out this reaction, temperature and pressure are not critical and the reaction temperature may suitably vary between −20° C. and the boiling temperature of the reaction mixture. In this reaction, room temperature (25° C.) is the preferred temperature, particularly where Hal' is bromine.

The epoxidation of a compound of formula I, Ia, Ib, or Ic wherein A and B taken together form a carbon to carbon bond, can expediently be carried out by treating the compound in an inert solvent with a peracid. In carying out this reaction, any conventional inert organic solvent may be utilized with the halogenated hydrocarbons such as methylene chloride or chloroform being preferred. Any conventional peracid may be utilized in this reaction. Among the preferred peracids are perbenzoic acid, peracetic acid, pertungstic acid, performic acid, m-chloroperbenzoic acid and perphthalic acid, with m-chlorobenzoic acid being especially preferred. In carrying out this reaction, temperature and pressure are not critical, the preferred temperature range being −10° C. to room temperature.

The epoxide of formula I, Ia, Ib or Ic can be converted to the corresponding epithio compound in one step by treating the epoxide with an episulphidizing agent at the reflux temperature of the reaction medium. Any conventional episulphidizing agents such as thio-cyanates (e.g., ammonium thio-cyanate), alkali metal thio-cyanates (e.g., sodium thio-cyanate), thio-urea, N-substituted thio-urea (e.g., thio-barbituric acid), thio-amides, or alkali metal thio-sulfates (e.g., sodium thio-sulfate), can be utilized in carrying out this one-step reaction. Among these episulphidizing agents, the alkali metal thio-cyanates and thio-urea are preferred. Generally, in carrying out this reaction, at least one mole of the episulphidizing agent is utilized per epoxide group contained within one mole of the epoxidized compound. In this manner, all of the epoxide groups contained within the epoxidized compound can be converted to epithio groups. Furthermore, this reaction is generally carried out in a solvent medium. Any conventional inert organic solvent can be utilized in carrying out this reaction, with the lower alkanols, such as ethanol and methanol being prefered.

When the compounds of formula I, Ia, Ib or Ic are unsaturated, they can, if desired, be hydrogenated in a conventional manner by, for example, hydrogenating in the presence of a conventional hydrogenation catalyst. In carrying out this reaction, temperature and pressure are not critical, a temperature range between about 25° C. and the boiling temperature of the reaction mixture and atmospheric or elevated pressures being preferred. Suitable as hydrogenation catalysts are, for example, Raney-nickel or preferably the noble metals; with palladium and platinum being especially preferred. Suitable as solvents are acetic acid ethyl ester and the alkanols such as methanol and ethanol.

The compounds of formula V can be obtained by reacting a compound of the formula:

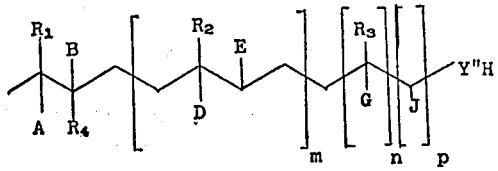

wherein $R_1$, $R_2$, $R_3$, $R_4$, A, B, D, E, G, J, $m$, $n$ and $p$ are as above and Y"H is —COOH, —CH$_2$OH,

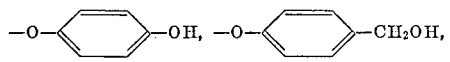

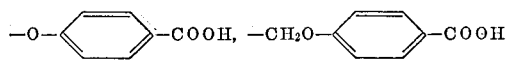

or

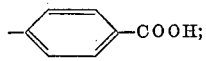

with an alkali metal hydride, alkali metal alcoholate or an alkali metal hydroxide, sodium being the preferred alaki metal. This reaction is preferably carried out in the presence of an inert organic solvent. Any conventional inert organic solvent may be utilized, with dioxane, tetrahydrofuran, dimethylformamide or diethyl ether being the preferred solvents with an alkali metal hydride, with a lower alkanol, especially methanol, being the preferred solvent with an alkali metal alcoholate, and with methanol, ethanol, acetone or the like being the preferred solvent with an alkali metal hydroxide. In carrying out this reaction, temperature and pressure are not critical, and the reaction can be carried out at room temperature.

The compounds of formula XI wherein Y"H is CH$_2$OH,

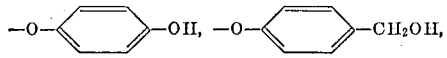

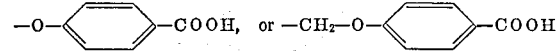

can be obtained by reacting the compounds of formulas III and IV, wherein R" is hydrogen. The compounds of formula XI, wherein Y"H is COOH, can be obtained by reacting the compounds of formulas VII and VIII, wherein R is hydrogen. The compounds of formula XI, wherein Y" is —CH$_2$OH or

OH can also be obtained by a conventional ether cleavage of the compound of formula Ia, wherein Y' is —OR" or

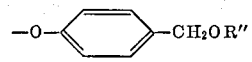

The compounds of formula XI, wherein Y" is COOH, can also be obtained by saponification of the compound of formula Ic wherein R is lower alkyl.

The saponification of a compound of formula Ic, wherein R is lower alkyl, can be carried out in a conventional manner using an alkali metal hydroxide, such as sodium or potassium hydroxide. In carrying out this reaction, temperature and pressure are not critical, and the reaction can be carried out at room temperature. In this reaction, any conventional inert solvent which dissolves both the alkali metal hydroxide and the compound of formula Ic may be utilized, with diethylene glycol being preferred.

The compound of formula IX can be obtained in a well known manner by a Grignard synthesis. In this synthesis, a compound of the formula:

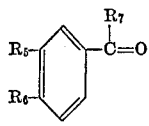

XII wherein $R_5$, $R_6$ and $R_7$ are as above; is first reacted with a Grignard reagent-loweralkylmagnesium halide, having the formula:

$$R_3'—Mg\ Br$$ XII wherein $R_8'$ is lower alkyl.

The reaction is conveniently conducted under conventional conditions of temperature, pressure and absence of moisture. The resulting Grignard product is then reacted with formaldehyde in a conventional manner. The preferred reaction procedure involves passing gaseous formaldehyde through the Grignard product. The complex which results from the foregoing reaction with formaldehyde is then decomposed by conventional techniques, preferably by treatment with aqueous ammonium chloride, to yield the compound of formula IX.

In the species of the hormone-compounds of this invention, wherein the side-chain is unsaturated or epoxidized, these species may exist as a cis/trans isomer mixture. The isomer mixture can be separated into the all cis or all trans isomers in a conventional manner by, for example, gas chromatography.

By this method, the isomer mixture is dissolved in an inert organic solvent, hexane, diethyl ether or acetic acid ethyl ester being preferred solvents, and then adsorbed on Kieselgel. The isomers adsorbed in different zones can be eluted with one of the aforesaid solvents or solvent mixtures and isolated.

The isomer mixtures can, in individual cases, also be separated by fractional distillation methods or possibly also by fractional crystallization methods.

The following examples illustrate the invention. All temperatures stated in degrees centigrade. The inert gas atmosphere is nitrogen. The m-chloroperbenzoic acid used in the epoxidation reactions in the example is stated in weight percent and means that the m-chloroperbenzoic acid contains also m-chlorobenzoic acid and that the percentage of m-chloroperbenzoic acid present in the mixture was determined by titration in the usual manner. The terms "hexane and 10% ethyl acetate" and "hexane and 15% ethyl acetate" encompass a solution consisting of 90% hexane and 10% ethyl acetate (by volume) and 85% hexane and 15% ethyl acetate (by volume) respectively. The ether used for extraction purposes in the examples is diethyl ether, unless otherwise specifically stated.

EXAMPLE 1

25 g. of a 50% by weight suspension of sodium hydride in mineral oil is washed twice in an inert gas atmosphere with 100 ml. of tetrahydrofuran each time and then added to 200 ml. of tetrahydrofuran. A solution of 76 g. of p-hydroxybenzoic acid methyl ester in 500 ml. of tetrahydrofuran is then added dropwise to the sodium hydride. 90 g. of 2-bromo-6-methylheptane in 200 ml. of hexamethyl phosphoric acid triamide is subsequently added dropwise to the mixture. The reaction mixture is heated under reflux conditions for 2 hours, then cooled, poured onto ice and exhaustively extracted with diethyl ether. The ether extract is washed with water, dried over sodium sulphate and evaporated under reduced pressure. The residual oil, p-[(1,5-dimethyl-hexyl)-oxy]-benzoic acid methyl ester is purified by adsorption on Kieselgel; Boiling Point (B.P.) 132–134° C./0.1 mm. Hg, $n_D^{24}$=1.4993.

EXAMPLE 2

By utilizing the procedure of Example 1, by reacting 2-bromo-6-methyl-hept-5-ene with p-hydroxybenzoic acid methyl ester, there is obtained p-[(1,5-dimethyl-hex-4-enyl)-oxy]-benzoic acid methyl ester; $n_D^{25}$=1.5109.

EXAMPLE 3

69 g. of 3,4-methylenedioxy-phenol (0.5 mol) is dissolved in 200 ml. of a 1:1 by volume mixture of ethanol and 1,2-dimethoxyethane containing 30.8 g. (0.55 mol) of potassium hydroxide. The mixture obtained is stirred at room temperature for 30 minutes and then, 120 g. (0.55 mol) of geranyl bromide is added. The mixture obtained is boiled at reflux for 10 hours. The reaction mixture is allowed to cool to room temperature. The solvent is removed in vacuum by distillation. The crude product is dissolved in diethyl ether and washed twice with 0.1-N aqueous caustic potash (KOH). The aqueous layer is backwashed with diethyl ether and the ethereal layers are combined and washed to the neutral point with water. The ether layer is separated off from the aqueous fraction and thereupon dried over anhydrous sodium sulphate. After filtration, the ethereal solution is distilled in vacuum, yielding 3,7-dimethyl-1-[(3,4-methylenedioxy)-phenoxy]-octa-2,6-diene.

EXAMPLE 4

14.4 g. of 3,7-dimethyl-1-[(3,4-methylenedioxy)-phenoxy]-octa-2,6-diene (0.05 mol) is dissolved in 200 ml. of methylene chloride and cooled to 0° C. Small portions of 11.39 g. of 79 wt. percent m-chloroperbenzoic acid (0.052 mol equivalents) in methylene chloride solution is added dropwise to the cooled solution, and the resulting mixture is allowed to stand at 0° C. for 16 hours. The mixture is thereupon poured into ice-cold 1-N aqueous caustic soda (NaOH), stirred, and the phases are then separated off. The aqueous layer is washed with methylene chloride. The organic layers are combined and washed with water. They are dried over anhydrous sodium sulphate, filtered and evaporated off. The crude epoxy compound obtained is purified by adsorption on Kieselgel. The epoxy compound is eluted with a hexane and ether mixture (90:10 parts by volume). 6,7-epoxy-3,7-dimethyl-1-[(3,4-methylenedioxy)-phenoxy] - oct-2-ene is obtained.

EXAMPLE 5

A solution of 2.56 g. of sodium in 65 ml. of absolute ethyl alcohol is added dropwise with ice-cooling to a solution of 25 g. of 9,10-epoxy-6,9,10-trimethyl-undec-5-en-2-one and 24.8 g. of diethylphosphonoacetic acid ethyl ester in 160 ml. of absolute ethanol. The mixture is then stirred at room temperature (25° C.) for 14 hours and subsequently concentrated in vacuum. The residue is poured onto saturated aqueous sodium chloride solution and exhaustively extracted with diethyl ether. The ether extract is washed with saturated, aqueous sodium chloride solution, dried over sodium sulphate and evaporated. Fractional distillation in high vacuum yields 10,11-epoxy-3,7,10,11-tetramethyl-2,6-dodecadienoic acid ethyl ester; B.P. 110–113° C./0.01 mm. Hg, $n_D^{20}$=1.4792.

EXAMPLE 6

110 g. of 79 wt. percent m-chloroperbenzoic acid in methylene chloride solution is added portionwise with ice-cooling to a solution of 100 g. of 6,9,10-trimethyl-undeca-5,9-dien-2-one in 2000 ml. of methylene chloride. The mixture is then stirred with ice-cooling for 1 hour and diluted with 1000 ml. of methylenechloride. The mixture is subsequently worked up by being successively washed with ice-cold 1-N caustic soda (NaOH) and saturated, aqueous sodium chloride solution, dried over sodium sulphate and evaporated. The residue is fractionally distilled in high vacuum. There is obtained 9,10-epoxy- 6,9,10-trimethyl-undec-5-en-2-one; B.P. 89–91° C./0.07 mm. Hg, $n_D^{20}$=1.4656.

EXAMPLE 7

14.7 g. of 3,7-dimethyl-2-cis/trans-6-octadienyl 2-propynyl ether is dissolved in 250 ml. of methylene chloride. 17.5 g. of 79% by weight m-chloroperbenzoic acid in methylene chloride solution is added portionwise over a period of 40 minutes with ice-cooling to this solution, and the mixture is then further stirred for 30 minutes with ice-cooling. The mixture is subsequently diluted with 500 ml. of diethyl ether and worked up according to the procedure of Example 5. Chromatography on Kieselgel with hexane and diethyl ether (8:2 parts by volume) yields 6,7 - epoxy-3,7-dimethyl-1-(2-propynyloxy)-2-cis/trans-octene. A sample is distilled in the bulb-tube. Boiling point ca 94–96° C./0.002 mm. Hg; $n_D^{20}$=1.4712.

EXAMPLE 8

10.5 g. of 50% by weight suspension sodium hydride in mineral oil is washed twice with 100 ml. of hexane and then added to 100 ml. of absolute tetrahydrofuran. 12.2 g. of propargyl alcohol is then added dropwise with ice-cooling. The mixture is stirred for an hour at room temperature and subsequently, with renewed ice-cooling, treated dropwise with 25 g. of geranyl bromide. Immediately after completion of the addition of geranyl bromide, 70 ml. of hexamethyl phosphoric acid triamide is added dropwise, and the mixture is stirred at room temperature (25° C.) for 2 hours. The reaction mixture is then worked up by being poured onto saturated, aqueous sodium chloride solution, exhaustively extracted with diethyl ether, the extract washed with saturated, aqueous sodium chloride solution, dried over sodium sulphate, filtered and evaporated. By chromatography on Kieselgel with hexane and diethyl ether (9:1) and subsequent distillation, there is obtained 3,7-dimethyl-2-cis/trans-6-octadienyl 2-propynyl ether. Boiling point: 62–64° C./0.1 mm. Hg; $n_D^{20}$=1.4763.

EXAMPLE 9

4.8 g. of a 50% by weight suspension of sodium hydride in mineral oil is washed twice with hexane in an inert gas atmosphere and then added to 40 ml. of absolute tetrahydrofuran. With ice-cooling and stirring of the sodium hydride mixture, a solution of 13.8 g. of 3,4-methylenedioxy-phenol in 80 ml. of absolute tetrahydrofuran is added thereto. The mixture is further stirred at room temperature (25° C.) for 1 hour. 23 g. of 2-bromo-6-methyl-hept-5-ene and, then with ice-cooling, 40 ml. of hexamethyl phosphoric acid triamide are added dropwise. The reaction mixture is heated under reflux for 2 hours, then cooled, poured onto ice-cold, 1-N hydrochloric acid and exhaustively extracted with diethyl ether. The ether extract is washed with saturated, aqueous sodium chloride solution, dried over sodium sulphate and evaporated under reduced pressure. The residual, oily 2-methyl-6-[(3,4-methylenedioxy)-phenoxy]-hept-2-ene is purified by adsorption on Kieselgel with hexane and diethyl ether (4:1 parts by volume); B.P. 97–99° C./0.04 mm. Hg; $n_D^{20}$=1.5200.

EXAMPLE 10

By utilizing the procedure of Example 9, by reacting 2 - bromo - 6 - methyl-oct-5-ene with 3,4-methylenedioxy-phenol, there is obtained 3-methyl-7-[(3,4-methylenedioxy)-phenoxy]-oct-3-ene; B.P. 108–110° C./0.1 mm. Hg; $n_D^{20}$=1.5182.

EXAMPLE 11

By utilizing the procedure of Example 9, by reacting 1-bromo-4-methyl-hex-3-ene with 3,4-methylenedioxy-phenol, there is obtained 4-methyl-1-[(3,4-methylenedioxy)-phenoxy]-hex-3-ene; B.P. 90° C./0.001 mm. Hg (bulb-tube distillation); $n_D^{20}$=1.5286.

EXAMPLE 12

By utilizing the procedure of Example 9, by reacting 1-bromo-3,4-epoxy-4-methyl-hexane with 3,4-methylenedioxy-phenol, there is obtained 3,4-epoxy-4-methyl-1-[(3,4-methylenedioxy)-phenoxy]-hexane; B.P. 100° C./0.001 mm. Hg (bulb-tube distillation); $n_D^{20}$=1.5222.

EXAMPLE 13

9.4 g. of a 50% by weight suspension of sodium hydride in mineral oil is washed twice with hexane in an inert gas atmosphere and then added to 100 ml. of absolute dimethylformamide. With ice-cooling and stirring of the mixture, a solution of 30 g. of piperonyl alcohol in 100 ml. of absolute dimethylformamide is added dropwise thereto. The mixture is further stirred at room temperature (25° C.) for 1 hour. 40 g. of 2-bromo-6-methyl-heptane is subsequently added dropwise. The reaction mixture is heated to 70° C. for 2 hours, then cooled, poured onto ice-water and exhaustively extracted with diethyl ether. The ether extract is washed with saturated, aqueous sodium chloride solution, dried over sodium sulphate and evaporated under reduced pressure. The residual, oily 2-methyl - 6 - [(3,4-methylenedioxy)-benzyloxy]-heptane is purified by adsorption on Kieselgel with hexane and diethyl ether (4:1 parts by volume); B.P. 170–172° C./1 mm. Hg.

EXAMPLE 14

3.1 g. of 2-methyl-6-[(3,4-methylenedioxy)-phenoxy]-hept-2-ene is dissolved in 100 ml. of acetic acid ethyl ester and hydrogenated at 25° C. and 1 atmosphere pressure in the presence of 0.5 g. of platinum oxide. The hydrogenation is terminated after the uptake of 1 mol equivalent of hydrogen. The catalyst is filtered off and the clear solution evaporated under reduced pressure. The residual 2-methyl-6-[(3,4-methylenedioxy)-phenoxy]-heptane is distilled in the bulb-tube; B.P. 100° C./0.001 mm. Hg; $n_D^{20}$=1.5004.

EXAMPLE 15

By utilizing the procedure of Example 14, hydrogenating 3-methyl - 7 - [(3,4-methylenedioxy)-phenoxy]-oct-3-ene, there is obtained 6-methyl-2-[(3,4-methylenedioxy)-phenoxy]-octane; B.P. 104–105° C./0.09 mm. Hg; $n_D^{20}$=1.4994.

EXAMPLE 16

By utilizing the procedure of Example 14, hydrogenating 4-methyl - 1 - [3,4-methylenedioxy)-phenoxy]-hex-3-ene, there is obtained 4-methyl-1-[(3,4-methylenedioxy)-phenoxy]-hexane; B.P. 100° C./0.01 mm. Hg (bulb-tube distillation); $n_D^{20}$=1.5057.

EXAMPLE 17

6.2 g. of 2-methyl-6-[(3,4-methylenedioxy)-phenoxy]-hept-2-ene is dissolved in 100 ml. of methylene chloride. With ice-cooling and stirring of the mixture, 5.4 g. of 80% by weight m-chloroperbenzoic acid in methylene chloride solution is added thereto, and the mixture is further stirred for 2 hours. The reaction mixture is then diluted with 100 ml. of methylene chloride and successively washed with ice-cold 1-N caustic soda (NaOH) and saturated, aqueous sodium chloride solution. The organic phase is separated off, dried over sodium sulphate and evaporated under reduced pressure. The residual 2,3-epoxy - 2 - methyl - 6 - [(3,4-methylenedioxy)-phenoxy]-heptane is purified by adsorption on Kieselgel with hexane and diethyl ether (4:1 parts by volume); B.P. 120° C./0.001 mm. Hg (bulb-tube distillation); $n_D^{20}$=1.5142.

EXAMPLE 18

By utilizing the procedure of Example 17, by epoxidizing 3-methyl - 7 - [(3,4-methylenedioxy)-phenoxy]-oct-3-ene, there is obtained 5,6-epoxy-6-methyl-2-[(3,4-methylenedioxy)-phenoxy]-octane; B.P. 120° C./0.001 mm. Hg (bulb-tube distillation); $n_D^{20}$=1.5120.

EXAMPLE 19

By utilizing the procedure of Example 17, by epoxidizing 4-methyl-1-[3,4-methylenedioxy)-phenoxy]-hex-3-ene, there is obtained 3,4-epoxy-4-methyl-1-[(3,4-methylenedioxy)-phenoxy]-hexane; B.P. 100° C./0.001 mm. Hg (bulb-tube distillation); $n_D^{20} = 1.5222$.

EXAMPLE 20

11.8 g. of a 50% by weight suspension of sodium hydride in mineral oil is washed twice in an inert gas atmosphere with 50 ml. of tetrahydrofuran each time and then added to 150 ml. of tetrahydrofuran. A solution of 36.5 g. of hydroquinone mono-2-propynyl ether in 80 ml. of tetrahydrofuran is then added dropwise to the sodium hydride mixture. 47.5 g. of 2-bromo-6-methylheptane in 80 ml. of hexamethyl phosphoric acid triamide are subsequently added dropwise to the mixture. The reaction mixture is heated under reflux conditions for 2 hours, cooled, poured onto ice and exhaustively extracted with diethyl ether. The ether extract is washed with water, dried over sodium sulphate and evaporated under reduced pressure. The residual, oily 1-[(1,5-dimethyl-hexyl)-oxy]-4-(2-propynyloxy)-benzene is purified by adsorption on Kieselgel; B.P. 150–152° C./1 mm. Hg.

EXAMPLE 21

43.5 g. of a 50% by weight suspension of sodium hydride in mineral oil is washed twice in an inert gas atmosphere with 100 ml. of tetrahydrofuran each time and then added to 150 ml. of tetrahydrofuran. A solution of 100 g. of hydroquinone in 100 ml. of tetrahydrofuran is then added dropwise to the sodium hydride mixture. 108 g. of propargyl bromide in 150 ml. of hexamethyl phosphoric acid triamide is subsequently added dropwise to the mixture. The reaction mixture is heated under reflux conditions for 2 hours, cooled, poured onto ice and exhaustively extracted with diethyl ether. The ether extract is washed with water, dried over sodium sulphate and evaporated under reduced pressure. The residual mixture is separated by chromatography on Kieselgel and eluted with hexane and 10% ethyl acetate to yield hydroquinone di-2-propynyl ether; Melting Point (M.P.) 50° C. With hexane and 15% ethyl acetate there is eluted hydroquinone mono-2-propynyl ether; B.P. 102° C./1 mm. Hg.

EXAMPLE 22

0.86 g. of a 50% by weight suspension of sodium hydride in mineral oil is washed twice in an inert gas atmosphere with 15 ml. of tetrahydrofuran each time and then added to 30 ml. of tetrahydrofuran and treated dropwise with a solution of 4.35 g. of p-[(1,5-dimethyl-hex-4-enyl)-oxy]-benzoic acid in 30 ml. of tetrahydrofuran. 4.2 g. of propargyl bromide in 25 ml. of hexamethyl phosphoric acid triamide is subsequently added dropwise to the mixture. The reaction mixture is heated under reflux conditions for 2 hours, then cooled, poured onto ice and exhaustively extracted with diethyl ether. The ether extract is washed with water, dried over sodium sulphate and evaporated under reduced pressure. The residual oily p-[(1,5-dimethyl-hex-4-enyl)-oxy]-benzoic acid 2-propynyl ester is purified by adsorption on Kieselgel; $n_D^{20} = 1.5252$.

EXAMPLE 23

By utilizing the procedure of Example 22, by reacting p-[(1,5-dimethyl-hexyl)-oxy]-benzoic acid with propargyl bromide, there is obtained p-[(1,5-dimethyl-hexyl)-oxy]-benzoic acid 2-propynyl ester; B.P. 207–210° C./1.0 mm. Hg.

EXAMPLE 24

By utilizing the procedure of Example 22, by reacting p-[(3,7,11-trimethyl-dodeca - 2,6,10 - trienyl)-oxy]-benzoic acid with propargyl bromide, there is obtained p-[(3,7,11-trimethyl-dodeca - 2,6,10 - trienyl)-oxy]-benzoic acid 2-propynyl ester; B.P. 245–250° C./0.1 mm. Hg.

EXAMPLE 25

7.2 g. of p-[(1,5-dimethyl-hex-4-enyl)-oxy]benzoic acid methyl ester is suspended in 30 ml. of 2-N aqueous caustic soda (NaOH), diluted with 50 ml. of a solution consisting of 50% methanol (by volume) and 50% water (by volume) and heated under reflux for 1½ hours. The reaction solution is then cooled, treated with 200 ml. of water and exhaustively extracted with diethyl ether. The alkaline aqueous phase is made acidic with 2-N hydrochloric acid and exhaustively extracted with diethyl ether. The ether extract is dried over sodium sulphate and evaporated under reduced pressure. The residual p-[(1,5-dimethyl-hex-4-enyl)-oxy]-benzoic acid is purified by crystallization from benzene; M.P. 57–59° C.

EXAMPLE 26

By utilizing the procedure of Example 25, p-[(1,5-dimethyl-hexyl)-oxy]-benzoic acid methyl ester is converted into p-[(1,5-dimethyl-hexyl)-oxy]-benzoic acid; M.P. 55° C.

EXAMPLE 27

By utilizing the procedure of Example 25, p-[(3,7,11-trimethyl-dodeca - 2,6,10 - trienyl) - oxy] - benzoic acid methyl ester is converted into p - [(3,7,11 - trimethyl-dodeca-2,6,10-trienyl)-oxy]-benzoic acid; M.P. 80–81° C.

EXAMPLE 28

4.8 g. of a 50% by weight suspension of sodium hydride in mineral oil is washed twice in an inert gas atmosphere with 25 ml. of tetrahydrofuran each time and then introduced into 50 ml. of tetrahydrofuran. A solution of 20 g. of p-[(1,5-dimethyl-hexyl)-oxy]-benzyl alcohol in 100 ml. of tetrahydrofuran is then added dropwise to the sodium hydride mixture. 10.3 g. of propargyl bromide in 40 ml. af hexamethyl phosphoric acid triamide is subsequently added dropwise to the mixture. The reaction mixture is heated under reflux conditions for 2 hours, then cooled, poured onto ice and exhaustively extracted with diethyl ether. The ether extract is washed with water, dried over sodium sulphate and evaporated under reduced pressure. The residual oily p-[(1,5-dimethyl-hexyl)-oxy]-α-2-propynyloxy-toluene is purified by adsorption on Kieselgel; B.P. 170–175° C./1 mm. Hg.

EXAMPLE 29

42 g. of p-[(1,5-dimethyl-hexyl)-oxy]-benzoic acid methyl ester is dissolved in 250 ml. of benzene and, with stirring, treated dropwise with 50 g. of 70% by weight bis-(2-methoxy-ethoxy) aluminum hydride in benzene. The reaction mixture is further stirred at room temperature for 5 hours and then treated with water. The organic phase is separated off, dried over sodium sulphate, carefully filtered, optionally using a filter aid, and evaporated under reduced pressure, yielding a residual of p-[(1,5-dimethyl-hexyl)-oxy]-benzyl alcohol; B.P. 180–182° C./1.0 mm. Hg.

EXAMPLE 30

3.9 g. of p-[(1,5-dimethyl-hex-4-enyl)-oxy]-benzoic acid 2-propynyl ester is dissolved in 150 ml. of methylene chloride. The solution is treated dropwise at 0° C. with a solution of 100 ml. of methylene chloride and 4.5 g. of 80% by weight of m-chloroperbenzoic acid in methylene chloride. After 15 minutes, the reaction mixture is successively washed with an aqueous solution of 2% by weight sodium bisulphite, with an aqueous solution of 5% by weight sodium bicarbonate and with water. The organic phase is separated off, dried over sodium sulphate and evaporated under reduced pressure. The residual p-[(4,5-epoxy-1,5-dimethyl-hexyl)-oxy]-benzoic acid 2-propynyl ester is purified by adsorption on Kieselgel; B.P. 120–123° C./0.05 mm. Hg.

EXAMPLE 31

To a suspension of 12.5 g. of sodium hydride in 75 ml. of dimethylformamide there was added dropwise while stirring a solution of 16.6 g. of 1,4-benzodioxane-6-methanol in 20 ml. of dimethylformamide. After that there was added dropwise 11.8 g. of propargylbromide. The reaction mixture was stirred for 3 hours at room temperature, cooled in an ice bath, mixed with 20 ml. of ice water, diluted with 150 ml. of water, and extracted 3 times with 150 ml. portions of diethyl ether. The ether extract was washed with water, dried over sodium sulfate and evaporated. The oily residue was chromatographed on silica gel whereby benzene was utilized as the eluting agent. One obtained 6 - [(2-propynyloxy)-methyl]-1,4-benzodioxane. $n_D^{24}=1.5487$.

EXAMPLE 32

Utilizing the procedure in Example 31:

1,3-benzodioxepine-7-methanol was converted to 3,4-dihydro - 7 - [(2-propynyloxy)-methyl]-2H-1,5-benzodioxepine; $n_D^{24}=1.5811$;

Piperonyl alcohol was converted to 3,4-(methylenedioxy)-α-(2-propynyloxy)-toluene; $n_D^{24}=1.5409$; and Veratryl alcohol is converted to 3,4-dimethoxy-α-(2-propynyloxy)-toluene; $n_D^{24}=1.5389$.

EXAMPLE 33

A solution containing 20.8 g. of α-ethylveratryl alcohol in 15 ml. of dimethylformamide was added dropwise with stirring to a suspension containing 12.5 g. of sodium hydride in 75 ml. of dimethylformamide. The reaction mixture was further stirred for ½ hour at room temperature. After this period, 11.8 g. of propargylbromide was added to the reaction. During this addition, the reaction temperature of 30° C. was not exceeded. After standing 3 hours at room temperature, the reaction mixture was then cooled in an ice bath to 5° C. It was then mixed with ice cold water at a temperature of 15° C. and thereafter extracted 3 times with 150 ml. of diethylether. The extract was washed to neutral with water and dried over sodium sulfate. After drying, the reaction mixture was filtered and the filtrate was evaporated under vacuum to dryness. The oily residue was chromatographed on silica gel utilizing a mixture of benzene and diethylether (9:1 parts by volume). One obtained 1,2-dimethoxy-4-[1-(2-propynyloxy)-propyl]-benzene. $n_D^{24}=1.5248$.

EXAMPLE 34

Utilizing the procedure of Example 33, the following reactions were carried out:

α-ethyl-3,4-dihydro-2H-1,5-benzodioxepine - 7 - methanol was converted to 3,4-dihydro-7-[1-(2 - propynyloxy)-propyl]-2H-1,5-benzodioxepine, $n_D^{24}=1.5304$;

α-ethyl-1,4-benzodioxane - 6 - methanol was converted to 6-[1-(2 - propynyloxy)-propyl] - 1,4 - benzodioxane, $n_D^{24}=1.5336$;

α-ethyl-piperonyl alcohol was converted to 1,2-(methylenedioxy) - 4 - [1-(2-propynyloxy)-propyl]-benzene, $n_D^{24}=1.5256$.

EXAMPLE 35

38.4 g. of 3,4-dimethoxybenzyl-α-ethynyl alcohol (prepared in accordance with Example 42) was dissolved in 200 ml. of ethyl acetate. This solution was hydrogenated in the presence of 1 g. of the Adams-Catalyst ($PtO_2$) till the mixture did not take up any hydrogen. After completion of the hydrogenation, the catalyst was filtered off and the solvent was completely evaporated. There remained α-ethyl-veratryl alcohol, B.P. 114–115° C./0.5 mm. Hg. By the same procedure there was prepared the following compounds:

α-ethyl-piperonyl alcohol, B.P. 101° C./0.6 mm. Hg;

α-ethyl-1,4-benzodioxane-6-methanol, B.P. 108°/0.02 mm. Hg;

α-ethyl-3,4-dihydro-2H-1,5 - benzodioxepine-7-methanol, B.P. 115–116° C./0.01 mm. Hg.

EXAMPLE 36

A solution containing 5 g. of α,α-diethyl-piperonyl alcohol in 10 ml. of tetrahydrofuran was added dropwise under stirring to a suspension containing 2.5 g. of sodium hydride in 25 ml. of tetrahydrofuran. The reaction mixture was allowed to stand for one hour at room temperature under constant stirring. After stirring there was added dropwise 6 g. of propargyl bromide and the temperature during this addition was never allowed to exceed 30° C. The reaction mixture was then cooled in an ice bath and mixed with ice cold water and then extracted with diethyl ether. The extract was washed neutral with water and dried over sodium sulfate. After drying, the mixture was filtered and the filtrate was dried under vacuum. After chromatography on silica gel and elution with benzene, one obtained α,α-diethyl-piperonyl-propargyl ether, $n_D^{24}=1.5291$.

EXAMPLE 37

3',4'-(methylenedioxy)-propiophenone (7.6 g.) was dissolved in diethyl ether (40 ml.). The solution was added under a nitrogen atmosphere to a Grignard solution. The Grignard solution was prepared from 1.2 g. of magnesium and 5.4 g. of ethyl bromide in 15 ml. of absolute diethyl ether. The mixture was stirred for 1½ hours while heating to reflux. Afterward, the mixture was allowed to stand under constant stirring at room temperature. The mixture was cooled in an ice bath followed by the addition of ice water. After this, a concentrated aqueous solution of ammonium chloride was added, and the resulting solution was extracted twice with 500 ml. portions of diethyl ether. The resulting ether extract was washed neutral with water and dried over sodium sulfate. After this, the resulting solution was evaporated to dryness. The remaining oil was distilled and one obtained a colorless α,α-diethyl-piperonyl alcohol, B.P. 106–107° C./0.65 mm. Hg.

EXAMPLE 38

16.6 g. of 2-(hydroxymethyl)-1,4-benzodioxane was added portionwise to a suspension of 12.5 g. of sodium hydride in 75 ml. of dimethylformamide. The mixture was stirred for 30 minutes and 11.8 g. of propargyl bromide was added thereto while the temperature was never allowed to exceed 35° C. The mixture was then allowed to stand for 3 hours under constant stirring at room temperature. After this period, the mixture was cooled under ice bath. After this, the excess sodium hydride was destroyed by the careful addition of 30 ml. of water. Thereafter, 300 ml. of water were added and the resulting mixture was extracted 3 times with 160 ml. portions of diethyl ether. The combined ether extracts were washed neutral with water and dried under sodium sulfate and evaporated. The residue was chromatographed on Kieselgel utilizing benzene as the eluting solvent. One obtained 2-[(2 - propynyloxy)-methyl] - 1,4 - benzodioxane, $n_D^{23}=1.5374$.

EXAMPLE 39

By the procedure given in Example 38, 83 g. of 2-(hydroxy-methyl)-1,4-benzodioxane and 108 g. of geranyl bromide gave 2-{[3,7-dimethyl - 2,6 - octadienyl)-oxy]-methyl}-1,4-benzodioxane, $n_D^{23}=1.5208$.

EXAMPLE 40

15.1 g. of the product prepared in Example 23 was dissolved in 100 ml. of acetic acid ethyl ester (with the addition of some molecular sieves). To the solution there was added 0.5 g. of platinum oxide. The mixture was allowed to stand for 2 hours under a hydrogen atmosphere. After the uptake of 2,350 ml. of hydrogen, the mixture was additionally shaken for 1 hour. After this period, the catalyst was filtered off and the solution was dried under vacuum. There resulted a colorless oil which was 2-{[(3,7-dimethyl-octyl)-oxy]methyl}-1,4-benzodioxane. The residue was distilled under high vacuum, B.P. 133–135° C./0.05 mm. Hg; $n_D^{23}$=1.4935.

EXAMPLE 41

93 g. of (α-ethynyl-piperonyl)-alcohol was dissolved in 1400 ml. of dichloromethane. To this solution there was added portionwise, 400 g. of manganese dioxide. The resulting mixture was stirred overnight at room temperature, filtered, and the filtrate evaporated. The residue was crystallized from acetone. One obtained pure 3',4'-(methylenedioxy)-propiolophenone, having a melting point of 116–117° C.

EXAMPLE 42

In a 6 l., three-necked flask there was placed 1,750 ml. of ammonia while the flask was under Dry Ice cooling. To the liquid ammonia, there was added portionwise, 35 g. of finely cut sodium. The mixture was stirred for 1 hour and acetylene gas was added to the blue solution until the solution turned colorless (about 1 hour). After a period of 1.5 hours, there was added a mixture of 150 g. of piperonal in 700 ml. of absolute ethyl ether. This addition was carried out dropwise and the mixture was allowed to stand under constant stirring. To this mixture there was added 300 g. of ammonium chloride in small portions and the Dry Ice cooling was removed. After this, there was added 1,000 ml. of dichloromethane. The mixture was allowed to stand overnight at room temperature and under constant stirring. After this period, the resulting ammoniacal solution was evaporated by gentle heating. To the evaporated reaction mixture, there was added 2,000 ml. of ice water under a nitrogen atmosphere. After this, the dichloromethane phase was separated. The dichloromethane phase was washed once with a saturated sodium chloride aqueous solution and then twice with water. After washing with water, it was dried over sodium sulfate and evaporated. The residue was triturated with diethyl ether (1 portion of ether for 3 portions of the substance) until crystallization occurred. The ether was then evaporated and the residue was combined with the crystalline mass. One obtained (α-ethynyl-piperonyl)-alcohol having a melting point of 39–40° C.

EXAMPLE 43

To a suspension of 1.1 g. of thiourea in 7.0 ml. of 2N-sulfuric acid there was added under intensive stirring inside a half an hour, 3.5 g. of p-[(4,5-epoxy-1,5-dimethyl-hexyl)-oxy]-benzoic acid methyl ester. The reaction mixture was stirred for 2 hours at 0° C. and then allowed to stand at room temperature. After this solution of 0.8 g. of sodium carbonate in 3.0 ml. of water was added while ice cooling. The resulting mixture was allowed to stand at room temperature under constant stirring. To this mixture was added a saturated aqueous sodium carbonate solution and afterwards the reaction mixture was extracted with diethyl ether. The ether extract was washed with the saturated aqueous carbonate solution, dried over sodium sulfate and evaporated. The residue was chromatographed on Kieselgel to obtain p-[(4,5-epithio-1,5-dimethyl-hexyl)-oxy]-benzoic acid methyl ester; $n_D^{21}$=1.5378.

EXAMPLE 44

To 9.3 g. of 2-cis/trans-geranium-allyl ester in 100 ml. of methylene chloride, there was added portionwise under ice cooling 9 g. of m-chloroperbenzoic acid (93% by weight). The mixture was allowed to stand for 2 hours under ice cooling while being constantly stirred. The reaction mixture was diluted with 100 ml. of methylene chloride and then washed with ice cold 1N caustic soda solution and then with a saturated aqueous sodium carbonate solution. After washing the mixture was dried over sodium sulfate, filtered and evaporated. After chromatography on Kieselgel with a mixture of hexane and diethyl ether (4:1 parts by volume) and distillation, one obtained pure 6,7-epoxy-3,7-dimethyl-2-cis/trans octanoic acid allyl ester; B.P. 81–84° C./0.005 mm. Hg; $n_D^{20}$=1.4728.

EXAMPLE 45

To a solution of 25.2 g. of geranium acid and 13.5 g. of pyridine in 150 ml. of diethyl ether there was added under ice cooling, 20.2 g. of thionyl chloride. This addition was carried out dropwise. The resulting solution was allowed to stand for 1 hour at room temperature under constant stirring and while protecting it from moisture. The precipitated pyridine hydrochloride was filtered off and washed with hexane. The reaction solution was dried under vacuum. The impure geranium acid chloride was taken up in benzene. The mixture was added dropwise under ice cooling to a solution of 9.3 g. of allyl alcohol and 13.5 g. of pyridine in 200 ml. of hexane and 80 ml. of benzene. The resulting mixture is allowed to stand at room temperature for 1 hour under constant stirring. The reaction mixture was added to a dilute ice cold hydrochloric acid solution and the organic phase separated. The water hydrochloric acid phase was extracted twice with hexane. The combined organic phases were washed first with a saturated sodium carbonate solution and then with a saturated aqueous sodium chloride solution and dried over sodium sulfate. After drying, the solution was filtered and evaporated by chromatography on Kieselgel with a mixture of hexane and diethyl ether (9:1 parts by volume) and distilled; there was obtained pure 2-cis/trans-geranium acid allyl ester; B.P. 70° C./0.01 mm. Hg; $n_D^{20}$=1.4800.

EXAMPLE 46

To 12.5 g. (3,7-dimethyl-2,6-octadienyl)-(1,1-dimethyl-2-propenyl)-ether in 130 ml. of methylenechloride there was added portionwise under ice cooling 11.5 g. of m-chloroperbenzoic acid. The mixture was stirred for 2 hours and then diluted with 130 ml. of methylene chloride. After dilution, the mixture was washed with ice cold aqueous 1N sodium hydroxide and with a saturated sodium chloride solution. After washing, the mixture was dried over sodium sulfate and evaporated. The residue was chromatographed on Kieselgel with a mixture of hexane and diethyl ether (9:1 parts by volume). One obtained pure 6,7-epoxy-3,7-dimethyl-1-[(1,1-dimethyl-2-propenyl)-oxy]-2-octene, B.P. 80° C./0.15 mm. Hg. $n_D^{20}$=1.4619.

EXAMPLE 47

9.6 g. of sodium hydride (a 50% by weight suspension in Nujol) was washed twice with hexane and added to 80 ml. of absolute tetrahydrofuran. To this mixture there is added dropwise under ice cooling 17.2 g. of 2-methyl-3-buten-2-ol in 150 ml. of absolute tetrahydrofuran. The reaction mixture is stirred for one hour at room temperature. Subsequently, 23 g. of geranyl bromide were added then 80 ml. of hexamethylphosphoric acid triamide were added dropwise while subjecting the reaction mixture to occassional ice cooling. The reaction mixture was then heated to reflux for 2 hours. The reaction mixture was cooled, washed with saturated aqueous sodium chloride solution and worked up as in Example 49. The residual (3,7 - dimethyl - 2,6-octadienyl)-(1,1-dimethyl-2-propenyl)-ether was purified by chromatographing on Kieselgel with hexanediethyl ether mixture (95 parts by volume: 5 parts by volume). The product had a boiling point of 58–59° C./0.08 mm. Hg.; $n_D^{20}$=1.4673.

EXAMPLE 48

To 3.8 g. of 3,6,7 - trimethyl-1-[(α-vinyl-piperonyl)-oxy]-2-cis/trans,6-octadiene in 40 ml. of methylene chloride, there was added portionwise under stirring and ice cooling, 2.5 g. of m-chloroperbenzoic acid (93% by weight). The mixture was allowed to stand under ice cooling for 2 hours while constant stirring. After this, the reaction mixture was diluted with 40 ml. of methylene chloride and with ice cold aqueous 1N sodium hydroxide. The reaction mixture was then washed with a saturated aqueous sodium chloride solution and dried under sodium sulfate and evaporated by chromatography on Kieselgel utilizing a mixture of hexane and diethyl ether (4:1 parts by volume) one obtained pure 6,7-epoxy-3,6,7 - trimethyl-1-[(α-vinyl-piperonyl)-oxy]-2-cis/trans-octene. The boiling point upon distillation was about 135° C./0.001 mm. Hg.; $n_D^{20}=1.5230$.

EXAMPLE 49

4.4 g. of sodium hydride (50% by weight suspension in Nujol) was washed with hexane and then added to 40 ml. of absolute tetrahydrofuran. Under ice cooling, 16 g. of α-ethynyl-piperonyl alcohol in 120 ml. of absolute tetrahydrofuran was added to the reaction mixture and the reaction mixture was stirred at room temperature for one hour. After this, under ice cooling there was added 21 g. of 3,6,7 - trimethyl-2-cis/trans-6-octadienyl-1-bromide and 40 ml. of hexamethyl phosphoric acid triamide and the reaction mixture was stirred for one hour. After this, the reaction mixture was washed with saturated aqueous sodium chloride solution and exhaustively extracted with diethyl ether. The diethyl ether solution was washed with saturated sodium chloride, dried and evaporated by chromatography on Kieselgel with hexane and diethyl ether (9:1 parts by volume) there was obtained pure 3,6,7-trimethyl-1-[(α-ethynyl piperonyl)-oxy]-2-cis/trans-6-octadiene; $n_D^{20}=1.5366$.

EXAMPLE 50

6.6 g. of 3,6,7-Trimethyl-1-[(α-ethinylpiperonyl)oxy]-2-cis/trans-6-octadiene in 60 ml. of high boiling petroleum ether and ethyl acetate mixture (3:1) there was added 0.7 ml. of quinoline and 0.7 g. of the Lindlar catalyst. The reaction mixture was hydrogenated until the theoretical portion of hydrogen was adsorbed. After this, the catalyst was filtered off and the reaction solution was washed with an ice cold aqueous hydrochloric acid solution. an aqueous sodium bicarbonate solution and a saturated aqueous sodium chloride solution and then dried over sodium sulfate and evaporated. After chromatography on Kieselgel with a mixture of hexane and diethylether (85:15 parts by volume) there was obtained 3,6,7-trimethyl - 1-[(α-vinylpiperonyl)oxy]-2-cis/trans-6-octadiene. Upon crystallization the product boiled at about 82° C./6 mm. Hg. $n_D^{20}=1.4388$.

EXAMPLE 51

In 12 g. of allyl-(1,5-dimethyl-4-hexenyl)ether in 120 ml. of methylenechloride there was added portionwise under stirring and ice cooling 14.6 g. of m-chloroperbenzoic acid (93% by weight). The reaction mixture stood for 1 hour under ice cooling while constantly stirring. The reaction mixture was then diluted with 120 ml. of methylene chloride and with ice cold 1N aqueous sodium hydroxide and with a saturated aqueous sodium chloride solution. After washing the reaction solution was dried over sodium sulfate and evaporated. By chromatography on Kieselgel utilizing hexane and diethyl ether solvent mixture (9:1 parts by volume) there is obtained pure 2,3-epoxy - 2-methyl-6-(2-allyloxy)-heptane. B.P. about 80° C./0.005 mm. Hg. $n_D^{20}=1.5230$.

EXAMPLE 52

9.6 g. of sodium hydride (50% by weight Nujol suspension) were washed with hexane and then added to 100 ml. absolute tetrahydrofuran. To this mixture there was added under ice cooling 25.4 g. of 6-methyl-5-hepten-2-ol and the reaction mixture was stirred at room temperature for one hour. Thereafter there was added under ice cooling 24.2 g. of allylbromide and 70 ml. of hexamethylphosphoric acid triamide. The reaction mixture was stirred at room temperature for 16 hours, poured over ice water, exhaustively extracted with diethyl ether, washed with a saturated aqueous sodium chloride solution and evaporated. By chromatography on Kieselgel with hexane and diethyl ether solvent mixture (9:1 parts by volume) and then distillation, one obtained pure allyl-(1,5 - dimethyl-4-hexenyl)-ether. B.P. 63–64° C./7 mm. Hg. $n_D^{20}=1.4442$.

EXAMPLE 53

To a solution containing 10 g. of 3-bromo-2,6,10-trimethyl - 12-allyloxy-6,10-dodecadien-2-ol (cis/trans mixture) in 14 ml. of absolute methanol there was added dropwise under ice cooling a solution containing 645 mg. of sodium and 14 ml. of absolute methanol. The reaction mixture was stirred for 60 minutes. The reaction mixture was then poured over ice water and exhaustively extracted with diethyl ether. The ether extract was worked up in the manner described in Example 49. By chromatography on Kieselgel utilizing a hexane-diethyl ether solvent mixture (4:1 parts by volume) there was obtained pure 1-(allyloxy) - 10,11-epoxy-3,7,11-trimethyl-2,6-dodecadiene (cis/trans mixture). B.P. 99–100° C./0.002 mm. Hg. $n_D^{20}=1.4751$.

EXAMPLE 54

4.8 g. of sodium hydride (50% by weight suspension Nujol) were washed twice with hexane and added to 57 ml. of absolute tetrahydrofuran. Under stirring and ice cooling 5.8 g. of allyl alcohol were added and the mixture was stirred for 1 hr. at room temperature. Thereafter, under ice cooling 28.5 g. of farnesyl bromide (cis/trans mixture) and 40 ml. of hexamethylphosphoric acid triamide were added. The reaction mixture was stirred for 2 hrs. at room temperature. The cooled reaction mixture was worked up in the same manner described in Example 49. By chromatography on Kieselgel with a hexane-diethyl ether solvent mixture (9:1 parts by volume) there was obtained pure allyl-(3,7,11-trimethyl-2,6,10-dodecatrienyl)-ether (cis/trans mixture). B.P. 94–95° C./0.001 mm. Hg $n_D^{20}=1.4807$.

EXAMPLE 55

To a homogeneous solution containing 14.5 g. of allyl-(3,7,11-trimethyl-2,6,10-dodecatrienyl) - ether (cis/trans mixture) in 155 ml. tetrahydrofuran and 25 ml. of water there was added portionwise under ice cooling 12.4 g. of N-bromosuccinimide. The reaction mixture was stirred for 6 hrs. under ice cooling. The crude reaction mixture was worked up in the manner described in Example 49. By chromatography on Kisselgel with hexane and diethyl ether (4:1 parts by volume) there is obtained pure 3-bromo-2,6,10-trimethyl-12-allyloxy-6,10-dodecadien - 2 - ol (cis/trans mixture) $n_D^{20}=1.5022$.

EXAMPLE 56

To a solution containing 9.33 g. of 4-bromo-3,7,11-trimethyl-13-allyloxy-7,11-tridecadien - 3 - ol (cis/trans mixture) in 16 ml. of absolute methanol there was added under ice cooling a solution containing 650 mg. of sodium in 16 ml. of absolute methanol. This addition was carried out dropwise and the reaction mixture was stirred for 60 minutes. The reaction mixture was poured over ice water, exhaustively extracted with diethyl ether and the ether extract was worked up in the same manner described in Example 49. By chromatography on Kieselgel with hexane-diethyl ether (4:1 parts by weight) there was obtained 1 - (allyloxy)-10,11-epoxy-3,7,11-trimethyl-2,6-tridecadien (cis/trans mixture). B.P. 120° C./0.005 mm. Hg (distillation) $n_D^{20}=1.4768$.

EXAMPLE 57

4.5 g. of sodium hydride (50% suspension in Nujol) were washed twice with hexane and then added to 17 ml. of absolute tetrahydrofuran. Under stirring and ice cooling, 20.2 g. of 3,7,11-trimethyl - 2,6,10 - tridecatrien-1-ol (cis/trans mixture) were added and the reaction mixture was stirred for 1 hr. at room temperature. Thereafter under ice cooling 10.9 g. of allyl bromide and 34 ml. of hexamethylphosphoric acid triamide were added and the reaction mixture was stirred at room temperature for 16 hrs. The reaction mixture was worked up in the same manner described in connection with the cooled reaction mixture in Example 49. By chromatography on Kieselgel with hexane and diethyl ether (4:1 parts by volume) there was obtained pure allyl - (3,7,11 - trimethyl-2,6,10-tridecatrienyl)-ether (cis/trans mixture). B.P. 87° C./10$^{-3}$ mm. Hg $n_D^{20}$=1.4813.

EXAMPLE 58

To a homogeneous solution containing 13.8 g. of allyl-(3,7,11-trimethyl-2,6,10-tridecatrienyl)-ether (cis/trans mixture) in 145 ml. of tetrahydrofuran and 23 ml. of water there was added under ice cooling 8.9 g. of N-bromosuccinimide. This addition was carried out portionwise. The reaction mixture was stirred for 6 hrs. under ice cooling. The reaction mixture was worked up in the same manner as the cooled reaction mixture in Example 49. By chromatography on Kieselgel with hexane/diethyl ether (4:1 parts by volume) there was obtained pure 4-bromo-3,7,11-trimethyl-13-allyloxy-7,11-tridecadien-3-ol; (cis/trans mixture) $n_D^{20}$=1.5035.

EXAMPLE 59

To a solution containing 5.08 g. of 4-bromo-7-ethyl-3,11 - dimethyl-13-allyloxy-7,11-tridecadien-3-ol (cis/trans mixture) in 8.5 ml. of absolute methanol there was added under ice cooling a solution containing 350 mg. of sodium in 8.5 ml. of absolute methanol. The reaction mixture was stirred for 60 minutes. After this the reaction mixture was poured over ice water, exhaustively extracted with diethyl ether. The ether extract was worked up in the same manner described in Example 49. By chromatography on Kieselgel with hexane-diethyl ether (4:1 parts by volume) there was obtained pure 1-(allyloxy)-10,11-epoxy-7-ethyl-3,11-dimethyl-2,6-tridecadien (cis/trans mixture). B.P. about 125° C./0.001 mm. Hg $n_D^{20}$=1.4772.

EXAMPLE 60

2.44 g. of sodium hydride (50% suspension in Nujol) was washed twice with hexane and then added to 11 ml. of absolute tetrahydrofuran. To this mixture there was added under stirring and ice cooling a solution containing 12.7 g. of 7-ethyl-3,11-dimethyl-2,6,10-tridecatrien-1-ol (cis/trans mixture) in 11 ml. of absolute tetrahydrofuran. The reaction mixture was allowed to stand 1 hr. at room temperature under constant stirring. After this, there was added under ice cooling 6.5 g. of allyl bromide and 20 ml. of hexamethylphosphoric acid triamide and the reaction mixture was stirred for 4 hrs. at room temperature. The reaction was worked up in the same manner as described in connection with the cooled reaction mixture in Example 49. By chromatography on Kieselgel, with hexane/diethyl ether (4:1 parts by volume) there was obtained pure allyl-(7-ethyl-3,11-dimethyl-2,6,10-tridecatrienyl)-ether (cis/trans mixture). B.P. 93° C./0.001 mm. Hg $n_D^{20}$=1.4800.

EXAMPLE 61

To a homogeneous solution containing 8.34 g. of allyl-(7-ethyl-3,11-dimethyl - 2,6,10 - tridecatrienyl)-ether (cis/trans mixture) in 82 ml. of tetrahydrofuran and 13 ml. of water there was added portionwise under ice cooling 5.2 g. of N-bromo succinimide. The reaction mixture was cooled for 6 hrs. under ice cooling while constantly stirring. The reaction mixture was worked up in the same manner described in Example 49 with regard to the cooled reaction mixture. By chromatography on Kieselgel with hexane-diethyl ether (4:1 parts by volume) there was obtained pure 4-bromo-7-ethyl-3,11-dimethyl-13-allyloxy-7,11-tridecadien-3-ol (cis/trans mixture) $n_D^{20}$=1.5019.

EXAMPLE 62

4.1 g. of a 50% by weight suspension of sodium hydride in mineral oil was washed twice with 25 ml. portions of tetrahydrofuran while under an inert gas atmosphere. After this, it was added to 50 ml. of tetrahydrofuran. To this mixture there was added dropwise, a solution containing 20 g. of p-[(1,5-dimethylhexyl)-oxy]-benzyl alcohol in 100 ml. of tetrahydrofuran. To this mixture there was added 10.3 g. of propargyl bromide in 40 ml. of hexamethyl phosphoric acid triamide. The reaction mixture was stirred under reflux for 2 hours, then cooled, and then poured over ice and exhaustively extracted with diethyl ether. The ether extract was washed with water, dried over sodium sulfate and extracted under vacuum. The resulting oil p-[(1,5-dimethyl-hexyl)-oxy]-α-propargyloxy-toluene can be purified by adsorption on Kieselgel. The compound boiled at 170–175° C./1.0 mm. Hg.

EXAMPLE 63

42 g. p-[(1,5-dimethyl-hexyl)-oxy]-benzoic acid methyl ester was dissolved in 250 ml. of benzene. To this solution there was added dropwise 50 g. of 70% by weight solution of bis(2-methoxy-ethoxy)-sodium aluminum hydride. The reaction solution was stirred for 5 hours at room temperature and then water was added. The organic phase was separated and dried under sodium sulfate and then carefully filtered with a filter aid, filtered and then evaporated under reduced temperature to dryness. There remained p-[(1,5-dimethyl-hexyl)-oxy]-benzyl alcohol, B.p. 180–182° C./1.0 mm. Hg.

EXAMPLE 64

By the procedure of Example 63, p-[(3-methyl-2-butenyl)-oxy]-benzyl alcohol and propargyl bromide were reacted to give 1-[(3-methyl-2-butenyl)-oxy]-4-propargyloxy-toluene, B.p. 146–149° C./1.0 mm. Hg.

EXAMPLE 65

10.1 g. of a 50% by weight suspension of sodium hydride in mineral oil was washed under an inert gas atmosphere with 50 ml. of tetrahydrofuran and then added to 100 ml. of tetrahydrofuran. To this mixture there was added dropwise the solution of 32 g. of p-hydroxy benzoic acid methyl ester in 200 ml. of tetrahydrofuran. To this mixture there was added 40.5 g. of 1-bromo-3-methylbut-2-ene in 80 ml. of hexamethyl phosphoric acid triamide. The reaction mixture was heated at reflux for 2 hours and then cooled and then poured over ice and exhaustively extracted with diethyl ether. The ether extract was washed with water, dried over sodium sulfate and evaporated to dryness under reduced temperature. The remaining oil p-[(3-methyl-2-butenyl)-oxy]-benzoic acid methyl ester could be purified by absorption on Kieselgel.

This compound can, in the same manner as in Example 63, be converted to p-[(3-methyl-2-butenyl)-oxy]-benzyl alcohol, M.p. 41–42° C.

EXAMPLE 66

10.9 g. og trans-7-chloro-3,7-dimethyl-2-nonenoic acid was mixed at room temperature with 23.8 g. of thionyl chloride. The reactor mixture was heated 60° C. and stirred for 15 minutes. The excess thionyl chloride was evaporated on a rotary evaporator. After this, 11.6 g. of allyl alcohol was added. The reaction mixture was heated for an additional 15 minutes at 60° C., poured over ice water and exhaustively extracted with diethyl ether. The combined ether solutions were washed first with saturated aqueous sodium bicarbonate and a saturated aqueous sodium chloride solution. After washing, the ether solution was dried over sodium sulfate and evaporated. By chromatography on Kieselgel with hexane-diethyl ether (85:15 parts by volume) there was obtained pure trans-7-chloro-3,7-dimethyl-2-nonenoic acid-allyl ester. The boiling point on distillation was about 100° C./0.001 mm. Hg, $n_D^{20}$=1.4869.

EXAMPLE 67

In a solution containing 21 g. of 3,7-dimethyl-2,6-nonadienoic acid (cis/trans mixture) in 400 ml. of acetic acid there was added at 0–12° C. hydrogen chloride in gas form until the solution was saturated. After this, the hydrochloric acid and acetic acid were evaporated off to dryness under reduced pressure and the reaction product crystallized. From petroleum ether (boiling point 40–60° C.) crystallized in the cold (—20° C.) there was obtained trans-7-chloro-3,7-dimethyl-2-nonenoic acid. M.p. 45.8–46.8° C.

EXAMPLE 68

15 g. of cis/trans-7-chloro-3-ethyl-7-methyl-2-nonenoic acid were added at room temperature to 30.7 g. of thionyl chloride. The reaction was stirred for 15 minutes while heating to 60° C. The excess thionyl chloride was evaporated on a rotary evaporator. After this, 14.5 g. of propargyl alcohol were added to the reaction mixture. The reaction mixture was further heated for 15 minutes at 60° C. and then poured over ice water and exhaustively extracted with diethyl ether. The combined ether solutions were washed with saturated aqueous sodium carbonate and saturated aqueous sodium chloride solutions, dried over sodium sulfate and evaporated. By chromatography on Kieselgel utilizing hexane and diethyl ether (9:1 parts by volume) was obtained pure cis/trans-7-chloro-3-ethyl-7-methyl-2-nonenoic acid propynyl ester. The boiling point on distillation was about 100° C./0.001 mm. Hg, $n_D^{20} = 1.4910$.

EXAMPLE 69

To a solution containing 18 g. of 3-ethyl-7-methyl-2,6-nonadienoic acid (cis/trans mixture) in 350 ml. of acetic acid there was added hydrogen chloride in gas form at a temperature of from 0–12° C. until the solution was saturated. After this, the reaction mixture was evaporated to dryness under reduced pressure. The crude product cis/trans-7-chloro-3-ethyl-7-methyl-2-nonenoic acid can be utilized without the need for further purification. Upon crystallization from petroleum ether (B.p. 40–60° C.) pure trans-7-chloro-3-ethyl-7-methyl-2-nonenoic acid was obtained. M.p. 51–52° C.

EXAMPLE 70

To a solution of 9.3 g. of trans-7,11-dichloro-3,7,11-trimethyl-2-dodecenoic acid, 2.92 ml. of pyridine in 50 ml. of absolute diethyl ether, there was added dropwise under stirring and ice cooling, 2.6 ml. of thionyl chloride. The reaction mixture was stirred at room temperature for 1 hour. After the pyridine hydrochloride precipitated out, the reaction mixture was filtered, washed with diethyl ether and evaporated. To this reaction mixture there was added 6.7 g. of propargyl alcohol. The reaction mixture was then heated at 60° C. for 30 minutes, poured over ice water and exhaustively extracted with diethyl ether. The combined ether extracts were washed with a saturated aqueous sodium chloride, dried over sodium sulfate and evaporated. By chromatography on Kieselgel with hexane-diethyl ether (4:1 parts by volume) there was obtained pure trans-7,11-dichloro-3,7,11-trimethyl-2-dodecenoic acid propynyl ester. This compound upon distillation had a boiling point of about 125° C./0.001 mm. Hg, $n_D^{20}=1.4982$.

EXAMPLE 71

43.2 g. of trans-1,11-dichloro-3,7,11-trimethyl-2-dodecenoic acid were mixed with 66.6 g. of thionyl chloride at room temperature. The reaction mixture was stirred for 15 minutes under heating to 60° C. The excess thionyl chloride was evaporated by a rotary evaporator. After evaporation, 32.6 g. of allyl alcohol were added. The reaction mixture was heated to 60° C. for 15 minutes. After this period, it was poured over ice water and exhaustively extracted with ether. The combined ether solutions were washed with saturated aqueous sodium carbonate and saturated sodium chloride, then dried over sodium sulfate and evaporated. By chromatography on Kieselgel with hexane-diethyl ether (9:1 parts by volume) there was obtained pure trans-7,11-dichloro-3,7,11-trimethyl-2-dodecanoic allyl ester. This compound, upon distillation, had a boiling point of 130° C./0.001 mm. Hg, $n_D^{20}=1.4891$.

EXAMPLE 72

To a solution of 90 g. of 3,7,11-trimethyl-2,6,10-dodecatrienoic acid (cis/trans mixture) in 1,700 ml. of acetic acid, there was added gaseous hydrogen chloride at a temperature of 0–15° C. until the solution was saturated. After this, the ethyl acetate and the hydrogen chloride were evaporated under a vacuum and the crude product crystallized. From petroleum ether (boiling point 46–60° C.) crystallized in the cold was obtained pure trans-7,11-dichloro-3,7,11-trimethyl - 2 - dodecanoic acid m.p. 92.5–94.° C.

EXAMPLE 73

7.45 g. of sodium were dissolved in 160 ml. of ethyl alcohol. To this solution there was added 50 g. of citronellal and 85 g. of 1-carbethoxy-2-methyl-1-propenyl-diethylphosphonate in 480 ml. of absolute ethyl alcohol at a temperature of 0° C. under stirring. Thereafter, the reaction mixture was stirred for 2 hours at room temperature. The reaction mixture was poured over ice and extracted with diethyl ether. The ether phase was washed neutral, dried and evaporated. The crude product was chromatographed with 3 kg. of Kieselgel (eluting agent hexane/10% ethyl acetate). One obtained 3,7,11-trimethyl-2-cis/trans-10, trienoic acid ethyl ester, B.p. 97–98° C./0.018 mm. Hg (colorless material).

EXAMPLE 74

6 g. 3,7,11-trimethyl-2-cis/trans, 4-cis/trans-dodecatrienoic acid ethyl ester was dissolved in 75 ml. of methylene chloride. To this solution there was added portionwise at a temperature of 0° C. under constant stirring, 5 g. of m-chloroperbenzoic acid (about 80% by weight). Thereafter, the reaction mixture was stirred for one hour and a half at 0° C. The reaction mixture was poured over a mixture of ice and a 1N sodium hydroxide solution and exhaustively extracted with ether. The ether phase was washed neutral, dried and evaporated. The product was chromatographed with a 50 fold portion of Kieselgel (eluting agent hexane/ethyl acetate 20%). One obtained 10,11-epoxy-3,7,11-trimethyl-2-cis/trans, 4-cis/trans dodecadienoic acid ethyl ester as a colorless oil. B.p.=about 135° C./0.01 mm. Hg, (distillation) $n_D^{20}=1.4907$.

EXAMPLE 75

16 g. of 3,7,11-trimethyl-2-cis/trans, 4-cis/trans, 10-dodecatrienoic acid ethyl ester was dissolved in 320 ml. of methanol and 80 ml. of tetrahydrofuran. This solution was cooled to about 0° C. and 34 g. of potassium hydroxide in 80 ml. of water were added thereto. The mixture was stirred for 18 hours at room temperature. The mixture was poured over water and extracted with ether. The aqueous phase was slightly acidified with 3N aqueous sulfuric acid and thereafter the water phase was extracted with ether. The resulting ether extracts were washed neutral, dried and evaporated. One obtained 3,7,11-trimethyl-2-cis/trans, 4-cis/trans, 10-dodecatrienoic acid as a light colored oil which was distilled. B.p.=121° C./0.06 mm. Hg, $n_D^{20}=1.5123$.

EXAMPLE 76

2.9 g. of a 50% by weight sodium hydride suspension in mineral oil was removed from the oil by adding absolute hexane. After this, 30 ml. of absolute *tetrahydrofuran* were added. Thereafter, 13.5 g. of 3,7,11-trimethyl-2-cis/ trans, 4-cis/trans, 10-dodecatrienoic acid dissolved in 70 ml. of absolute tetrahydrofuran were slowly added at a temperature of about 0° C. After 30 minutes of reflux, the reaction mixture was cooled to 0° C. and 11.8 g. of propargyl bromide and 30 ml. of hexamethyl phosphoric acid triamide were added. The reaction mixture was then heated for 4 hours at reflux. The reaction mixture was poured over ice water and extracted with ether. The ether phase was washed, dried and evaporated. The crude product was chromatographed with a 50-fold portion of Kieselgel (eluting medium hexane/20% ethyl acetate). One obtained 3,7,11-trimethyl-2-cis/trans, 4-cis/trans, 10-dodecatrienoic acid propargyl ester as a colorless oil. B.p. about 125° C./0.02 mm. Hg (distillation), $n_D^{20}$=1.5122.

EXAMPLE 77

4.1 g. 3,7,11-trimethyl-2-cis/trans, 4-cis/trans, 10-dodecatrienoic acid propargyl ester was dissolved in 50 ml. of methylenechloride. To this solution at 0° C. there was added portionwide 3.6 g. of m-chloroperbenzoic acid (about 80% by weight). After standing 1½ hour at 0° C., the reaction mixture was poured over a mixture of ice and a 1N sodium hydroxide aqueous solution and then extracted with ether. The ether phase was washed, dried and evaporated. The crude product was chromatographed with a 50-fold portion of Kieselgel (eluting agent hexane/ethyl acetate 20%). One obtained 10,11-epoxy-3,7,11-trimethyl-2-cis/trans, 4-cis/trans-dodecadienoic acid propargyl ester as a colorless oil. B.p. about 130° C./0.04 mm. Hg (distillation), $n_D^{20}$=1.5089.

EXAMPLE 78

5.1 g. trimethyl-2-cis/trans, 4-cis/trans, 10-dodecatrienoic acid ethyl ester was dissolved in 50 ml. of benzene. To this solution at 10° C. under constant stirring there was added 7.5 g. of sodium aluminum-bis-(2-methoxy-ethoxy)-hydride (about 70% by weight in benzene). After standing one hour at room temperature, water saturated diethyl ether was added followed by the slow addition of water. After this, the reaction mixture was filtered and the ether portion was washed neutral, dried and evaporated. The crude oil was distilled. One obtained 3,7,11-trimethyl-2-cis/trans, 4-cis/trans-10-dodecatrien-1-ol. B.p.=about 105° C./0.01 mm. Hg (distillation), $n_D^{20}$=1.5024.

EXAMPLE 79

800 mg. of a 50% by weight suspension of sodium hydride in mineral oil was washed with hexane to free it from the oil. After washing, the sodium hydride was added to 15 ml. of absolute tetrahydrofuran. To this mixture there was added at 0° C. while stirring, 3.8 g. of 3,7,11-trimethyl-2-cis/trans, 4-cis/trans, 10-dodecatrien-1-ol in 15 ml. of tetrahydrofuran. Thereafter, it was stirred at room temperature. At 0° C. 3 g. of propargyl bromide and 10 ml. of hexamethyl phosphoric acid triamide were added. The reaction mixture was stirred for 1½ hours at 40° C. Thereafter, it was poured over ice water and extracted with ether. The ether solution was washed, dried and evaporated. The crude product was chromatographed with a 50-fold portion of Kieselgel (eluting agent hexane-ethyl acetate 20%). One obtained 3,7,11-trimethyl-2-cis/trans, 4-cis/trans, 10-dodecatrienyl propargyl ether. B.p.=about 115° C./0.01 mm. Hg (distillation), $n_D^{20}$=1.4983.

EXAMPLE 80

3.67 g. of magnesium turnings were added to 20 ml. of ether. To this there was added a solution of 21.4 g. of methyl iodide in 40 ml. of diethyl ether. This addition was carried out so that the reaction mixture was maintained at a constant rate of boiling. The Grignard solution thus prepared was cooled in an ice bath and added to 14.2 g. of 6-phenyl-5-hepten-2-one in 50 ml. of diethyl ether. The reaction mixture was allowed to heat at reflux for about an hour. The solution was then poured over a mixture of ice and hydrochloric acid and the ether phase was separated. The aqueous phase was extracted twice with diethyl ether, washed neutral, and the ether solution was dried over sodium sulfate. After evaporation in a vacuum, there was obtained 15.6 g. of a colorless oil. After that, 30 g. of potassium hydrogen sulfate were added to the colorless oil. This mixture was allowed to heat for 2 hours at 150° C. To the cooled mixture there was added diethyl ether. This mixture was filtered. The crude product was chromatographed on 650 g. of aluminum oxide (neutral, Activity Grade I), eluting agent hexane. One obtained a colorless oil which was vacuum distilled. B.p.=52° C./0.01 mm. Hg $n_D^{20}$=1.5341.

The product obtained was a mixture of 2-methyl-6-phenyl-2,5-cis/trans-heptadiene and 2-methyl-6-phenyl-1,5-cis/trans-heptadiene.

The experiments described in the following examples are carried out with the following representative examples of the hormone-compounds which are usable in combination with an insect poison to form the active substance for an insecticide composition of this invention:

(A) trans 7,11-dichloro-3,7,11-trimethyl-dodec-2-enoic acid ethyl ester;
(B) cis/trans mixture of 10,11-epoxy-7-ethyl-3,11-dimethyl-trideca-2,6-dienoic acid methyl ester;
(C) 10,11-epoxy-3,7,11-trimethyl-dodeca-2-cis/trans-6-cis-dienyl ethyl ether;
(D) 10,11-epoxy-3,7,11-trimethyl-dodeca-2,6-trans-dienoic acid ethyl ester;
(E) p-[(1,5-dimethyl-hexyl)-oxy]-benzoic acid methyl ester;
(F) 6,7-epoxy-3,7-dimethyl-1-[(3,4-methylenedioxy)-phenoxy]-oct-2-cis/trans-ene;
(G) 10,11-epoxy-3,7,10,11-tetramethyl-dodeca-2-cis/trans-6-cis/trans-dienoic acid ethyl ester;
(H) 10,11-epoxy-3,7,11-trimethyl-trideca-2,6-dienoic acid ethyl ester;
(I) 6,7-epoxy-3,7-dimethyl-1-(2-propynyloxy)-oct-2-cis/trans-ene;
(J) isomers of 10,11-epoxy-7-ethyl-3,7-dimethyl-trideca-2,6-dienoic acid ethyl ester;
(K) 1-(methoxy)-3,7,11-trimethyl-dodeca-2,6,10-triene;
(L) N-farnesyl-diethylamine;
(M) geranyl-allylether;
(N) (10,11-epoxy-3,7,11-trimethyl-2-cis/trans-6-cis-dodeca-dienyl)-methyl-ether;
(O) p-[(4,5-epoxy-1,5-dimethylhexyl)oxy]benzoic acid methyl ester;
(P) p-[(6,7-epoxy-3,7-dimethyl-2-octenyl)oxy]benzoic acid methyl ester;
(Q) 10,11-epithio-3,7,10,11-tetramethyl-2,6-dodecadienoic acid ethyl ester;
(R) p-[(3,7-dimethyl-2,6-octadienyl)oxy]benzoic acid ethyl ester;
(S) 2-[(2-propynyloxy)methyl]-1,4-benzodioxane;
(T) p-[(1,5-dimethylhexyl)oxy]benzoic acid-2-propynyl ester;
(U) 6,7-epoxy-3,7-dimethyl-2-octenoic acid allyl ester;
(V) 3,4-(methylenedioxy)-α-(2-propynyloxy)toluene;
(W) mixture of
    2-methyl-6-phenyl-2,5-heptadiene and
    2-methyl-6-phenyl-1,5-heptadiene;
(X) 4'methoxypropiolophenone;
(Y) 3,4-dimethoxy-α-(2-propynyloxy)toluene;
(Z) 1-[(1,1-dimethylallyl)oxy]-6,7-epoxy-3,7-dimethyl-2-octene;
(AA) p-[(3-methyl-2-butenyl)oxy]-α-(2-propynyloxy)toluene;
(BB) 6-(allyloxy)-2,3-epoxy-2-methylheptane;
(CC) 7-chlor-3,7-dimethyl-2-nonenic acid-2-allyl ester;
(DD) 7-chlor-2,3-dimethyl-2-nonenic acid-2-propynyl ester;

(EE) 7,11-dichlor-3,7,11-trimethyl-2-dodecenoic acid-2-propynyl ester;
(FF) 7,11-dichlor-3,7,11-trimethyl-2-dodecenoic acid-2-allyl ester;
(GG) (3,7,11-trimethyl-2,6,10-dodecatrienyl)-allyl-ether;
(HH) 1-(allyloxy)-10,11-epoxy-3,7,11-trimethyl-2,6-dodecadiene;
(II) 1-(allyloxy)-3,7,11-trimethyl-2,6,10-tridecatriene;
(JJ) 1-(allyloxy)-10,11-epoxy-3,7,11-trimethyl-2,6-tridecadiene; and
(KK) p-[(4,5-epithio-1,5-dimethylhexyl)oxy]benzoic acid methyl ester.

The results for each example are provided in a table at the end thereof. The concentration for each $LD_{50}$ determination is stated logarithmically in terms of the concentration of insect poison (e.g., $3=10^{-3}$ g./cm.$^3=1°/00$). Said $LD_{50}$ values define the concentration of insect poison present at which 50% of the insects die or become crippled. In case the ratio of insect poison to hormone compound is 0 to 100 (I: J.H.=0:100) the $LD_{50}$ values stated refer to the hormone compound itself (and are not based on the insect poison).

EXAMPLE 81

For each variant, a seedling of the field bean with ca 50–100 black bean aphids is sprayed with acetonic active substance solution or an aqueous spray dispersion. The plants are then placed individually in tubes in water. After 24 and 48 hours, the dead and surviving aphids are counted and the activity calculated in percent.

Concentration is stated logarithmically in g./cm.$^3$ (e.g., $3=10^{-3}$ g./cm.$^3=1\%$). The dosage per treated surface is $10^{-5}$ g./cm.$^2=1$ kg./hectare with a concentration of 3.

TABLE 1.—APHIDS
[$LD_{50}$ concentration based on insect-poison]

| Insect-poison | Ratio I:J.H.[1] | (A) | (B) | (C) | (D) | (E) | (F) | (G) | (H) | (I) | (J) |
|---|---|---|---|---|---|---|---|---|---|---|---|
| Pyrethrum | 100:0 | 6.0 | 6.0 | 6.0 | 6.0 | 6.0 | 6.0 | 6.0 | 6.0 | 6.0 | 6.0 |
|  | 10:1 | 6.6 | 6.8 | 7.0 | 6.7 | 6.8 | 6.8 | 6.7 | 6.5 | 6.9 | 6.6 |
|  | 1:1 | 6.9 | 6.9 | 6.9 | 7.0 | 6.7 | 6.7 | 6.4 | 6.8 | 7.0 | 7.0 |
|  | 1:10 | 6.5 | 6.8 | 6.0 | 6.4 | 6.3 | 6.7 | 6.0 | 5.9 | 6.6 | 6.4 |
|  | 0:100 | <3 | <3 | <3 | <3 | <3 | <3 | <3 | <3 | <3 |  |
| Methoxychlor | 100:0 | 3 | 3 | 3 | 3 | 3 | 3 | 3 | 3 | 3 | 3 |
|  | 10:1 | 4 | 4.1 | 3 | 4.3 | 3.7 | 4.2 | 4.1 | 3.4 | 3.2 | 4 |
|  | 1:1 | 3.2 | 4.2 | 3.7 | 3.2 | 4.1 | 3.4 | 4 | 3.5 | 3.7 | 3.4 |
|  | 1:10 | 3–4 | 3–4 | 3–4 | 4.5 | 3–4 | 3–4 | 3–4 | 3–4 | 3–4 | 3–4 |
|  | 0:100 | <3 | <3 | <3 | <3 | <3 | <3 | <3 | <3 | <3 |  |

[1] I=Insect-poison; J.H.=Hormone-compound.

EXAMPLE 82

For each variant, two Petri dishes are sprayed with acetonic active substance solution or an aqueous spray dispersion. The dosage per treated surface is $10^{-5}$ g./cm.$^2=1$ kg./hectare with a concentration of 3. After 2–3 hours, 10 flies having an age of 4–5 days are introduced per Petri dish. A check is made after 1, 3 and 24 hours for flies which are dead or crippled.

Concentration is stated logarithmically in g./cm.$^3$ (e.g., $3=10^{-3}$ gm./cm.$^3=1\%$).

TABLE 2.—FLIES
[$LD_{50}$ concentration based on insect-poison]

| Insect-poison | Ratio I:J.H.[1] | (A) | (B) | (C) | (D) | (E) | (F) | (G) | (H) | (I) | (J) |
|---|---|---|---|---|---|---|---|---|---|---|---|
| Pyrethrum | 100:0 |  | 5.9 |  |  |  | 5.9 | 5.9 |  | 5.9 |  |
|  | 10:1 |  | 5.7 |  |  |  | 5.5 | 5.5 |  | 5.7 |  |
|  | 1:1 |  | 6.4 |  |  |  | 6.5 | 6.3 |  | 5.7 |  |
|  | 1:10 |  | 5.1 |  |  |  | 6.5 | 5.8 |  | 6.5 |  |
|  | 0:100 |  | <3 |  |  |  | <3 | 2.8 |  | 4 |  |
| Sevin | 100:0 | ~2.8 | ~2.8 | ~2.8 | ~2.8 | ~2.8 | ~2.8 | ~2.8 | ~2.8 | ~2.8 | ~2.8 |
|  | 10:1 | 2.9 | 2.9 | 3.1 | 3 | 3.4 | 4.7 | 2–3 | 2–3 | 4.5 | 3.2 |
|  | 1:1 | 2–3 | 2.9 | 3.2 | 2–3 | 3.5 | 4.5 | 2.9 | 2.9 | 5.2 | 3.3 |
|  | 1:10 | <4 | <4 | 3.8 | <4 | <4 | 4.8 | <4 | <4 | 5.6 | <4 |
|  | 0:100 | <3 | <3 | <3 | <3 | <3 | <3 | 2.8 | 2.9 | 4 |  |
| Methoxychlor | 100:1 | 4.4 | 4.4 |  |  |  |  |  | 4.4 | 4.4 | 4.4 |
|  | 10:1 | 4 | 4.2 |  |  |  |  |  | 4.6 | 4.7 | 4.4 |
|  | 1:1 | 4.7 | 4.7 |  |  |  |  |  | 4.4 | 4.9 | 4.6 |
|  | 1:10 | 4.1 | 3.5 |  |  |  |  |  | 3.9 | 4.7 | <4 |
|  | 0:100 | <3 | <3 |  |  |  |  |  | 2.9 | 4 |  |
| Malathion | 100:0 | 5.3 | 5.3 | 5.3 | 5.3 | 5.3 | 5.3 | 5.3 | 5.3 | 5.3 | 5.3 |
|  | 10:1 | 5.5 | 5.6 | 5.4 | 5.5 | 5.5 | 5.5 | 5.6 | 5.5 | 5.5 | 5.5 |
|  | 1:1 | 5.3 | 5.3 | 5.6 | 5.4 | 5.5 | 5.4 | 5.5 | 5.5 | 5.5 | 5.5 |
|  | 1:10 | 5–6 | 5–6 | 5.6 | 5–6 | 5–6 | 5–6 | 5–6 | 5–6 | 5–6 | 5–6 |
|  | 0:100 | <3 | <3 | <3 | <3 | <3 | <3 | 2.8 | 2.9 | 4 |  |

[1] I=Insect-poison; J.H.=Hormone-compound.

EXAMPLE 83

For each variant, 3 potato leaf discs (diameter 24 mm.) are sprayed on one side with active substance solution or an aqueous spray dispersion. With a concentration of 3, the dosage per treated surface is $10^{-5}$ g./cm.$^2$=1 kg./ha.

After ca ½ an hour, 10 Colorado beetle larvae (instar larvae 1–2) are distributed on the 3 disc (3,3,4) and enclosed in a plastic cage. After 24 hours and 48 hours, the damaged larvae are counted, the treated leaf discs being replaced by untreated ones after the first check.

Concentration is stated logarithmically (e.g., $3 = 10^{-3}$ g./cm.$^3$ = 1%).

TABLE 3.—COLORADO BEETLE
[LD$_{50}$ concentration based on insect-poison]

| Insect-poison | Ratio I:J.H.[1] | (A) | (B) | (C) | (D) | (E) | (F) | (G) | (H) | (I) | (J) |
|---|---|---|---|---|---|---|---|---|---|---|---|
| Sevin | 100:0 | 4.9 | 4.9 | | 4.9 | | 4.9 | 4.9 | | | |
| | 10:1 | 5.4 | 4.9 | | 4.8 | | 5.0 | 5.0 | | | |
| | 1:1 | 5.0 | 5.1 | | 5.1 | | 5.1 | 5.1 | | | |
| | 1:10 | 4.7 | 4.5 | | 4.2 | | 3–4 | 4.0 | | | |
| | 0:100 | <3 | <3 | | <3 | | <3 | <3 | | | |
| Methoxychlor | 100:0 | 3.9 | 3.9 | 3.9 | 3.9 | 3.9 | 3.9 | 3.9 | 3.9 | 3.9 | 3.9 |
| | 10:1 | 4.0 | 3.8 | 4.6 | 4.3 | 3.9 | 4.3 | 4.0 | 4.0 | 3.8 | 4.1 |
| | 1:1 | 3.7 | 4.4 | 4.6 | 4.4 | 4.0 | 5.0 | 4.7 | 3.9 | 4.4 | 4.8 |
| | 1:10 | 3–4 | 3–4 | 3–4 | 3–4 | 3–4 | 3.9 | 3–4 | 3–4 | 3–4 | 3–4 |
| | 0:100 | <3 | <3 | <3 | <3 | <3 | <3 | <3 | <3 | <3 | |

[1] I=Insect-poison; J.H.=Hormone-compound.

EXAMPLE 84

For each variant, 3 bean leaf discs with a 2-day infection, having 20–40 spider mites and eggs, are sprayed with an acetonic active substance solution or an aqueous spray dispersion. With a concentration of 3, the dosage per treated surface is $10^{-5}$ g./cm.$^2$=1 kg./ha. After 2 days, the discs are assessed for dead spider mites and killed eggs. (Assessment scheme: from 0–5, where 0=0% and 5=100% mortality).

Concentration is stated logarithmically in g./cm.$^3$ (e.g., $3 = 10^{-3}$ g./cm.$^3$ = 1%).

TABLE 4.—SPIDER MITES
[LD$_{50}$ concentration based on insect-poison]

| Insect-poison | Ratio I:J.H.[1] | (A) | (B) | (C) | (D) | (E) | (F) | (G) | (H) | (I) | (J) |
|---|---|---|---|---|---|---|---|---|---|---|---|
| Sevin | 100:0 | <3 | <3 | <3 | <3 | <3 | <3 | <3 | <3 | <3 | <3 |
| | 10:1 | <3 | 2.7 | <3 | 2.8 | 2.5 | 3.3 | 2.8 | 3.3 | 3.1 | 2.7 |
| | 1:1 | 3.4 | 3.2 | 2.7 | 3.5 | 2.7 | 3.4 | 3.2 | 3.4 | 3.2 | 3.3 |
| | 1:10 | <4 | <4 | <4 | <4 | <4 | <4 | <4 | 4.1 | 3.9 | <4 |
| | 0:100 | <3 | <3 | <3 | <3 | <3 | <3 | <3 | <3 | <3 | |
| Malathion | 100:0 | | | | | | | | 5.2 | | 5.2 |
| | 10:1 | | | | | | | | 5.5 | | 6.7 |
| | 1:1 | | | | | | | | 5.9 | | 5.9 |
| | 1:10 | | | | | | | | 5.8 | | 5.4 |
| | 0:100 | | | | | | | | <3 | | |
| Kelthane | 100:0 | | | | 5.4 | 5.4 | 5.4 | 5.4 | | | |
| | 10:1 | | | | 5.6 | 5.5 | | 5.5 | | | |
| | 1:1 | | | | 5.2 | 5.6 | 5.6 | 5.5 | | | |
| | 1:10 | | | | 4.5 | 5.5 | | 5.0 | | | |
| | 0:100 | | | | <3 | <3 | <3 | <3 | | | |

[1] I=Insect-poison; J.H.=Hormone-compound.

EXAMPLE 85

For each variant, 3 cotton leaf discs (diameter 24 mm.) are sprayed on one side with acetonic active substance solution or an aqueous spray dispersion. With a concentration of 3, the dosage per treated surface is $10^{-5}$ g./cm.$^2$ = 1 kg./ha. After ca ½ hour, 10 caterpillars (instar larvae 1–2) are distributed on the 3 discs (3,3,4) and enclosed in a plastic cage. After 24 and 48 hours, the damaged larvae are counted, the treated leaf discs being replaced by untreated ones after the first check.

Concentration is stated logarithmically (e.g., $3 = 10^{-3}$ g./cm.$^3$ = 1%).

TABLE 5.—PRODENIA
[LD$_{50}$ concentration based on insect-poison]

| Insect-poison | Ratio I:J.H. | (A) | (B) | (C) | (D) | (E) | (F) | (G) | (H) | (I) | (J) |
|---|---|---|---|---|---|---|---|---|---|---|---|
| Malathion | 100:0 | | | 3 | 3 | 3 | 3 | 3 | 3 | 3 | 3 |
| | 10:1 | | | 3.3 | 3 | 3.3 | 3.3 | 3.1 | 3.1 | 3 | 3.1 |
| | 1:1 | | | <3 | 3.3 | 3 | 3.1 | 3.2 | 3 | 3.2 | 3.2 |
| | 1:10 | | | <4 | <4 | <4 | <4 | <4 | <4 | <4 | <4 |
| | 0:100 | | | <3 | <3 | <3 | <3 | <3 | <3 | <3 | <3 |

[1] I=Insect-poison; J.H.=Hormone-compound.

EXAMPLE 86

Utilizing the procedure of Example 81, the following results were obtained:

TABLE 6.—APHIDS
[LD$_{50}$ concentration based on insect-poison]

| | Insect-poison=(I:J.H.[1]) | | | | | | | | | | | |
|---|---|---|---|---|---|---|---|---|---|---|---|---|
| | Sevin | | | Methoxychlor | | | Malathion | | | Allethrin | | |
| J.H. | 1:5 | 100:0 | 0:100 | 1:5 | 100:0 | 0:100 | 1:5 | 100:0 | 0:100 | 1:5 | 100:0 | 0:100 |
| K | | | | 4.2 | 3.3 | 2.3 | 5.5 | 5.1 | 2.3 | 5.2 | 5.0 | 2.3 |
| L | 6.4 | 5.7 | 3.0 | 4.4 | 3.3 | 3.0 | 5.2 | 5.1 | 3.0 | 5.5 | 5.0 | 3.0 |
| M | | | | 4.2 | 3.3 | 2.3 | 5.6 | 5.1 | 2.3 | ≥6 | 5.0 | 2.3 |
| N | 6.1 | 5.7 | 2.5 | 4.4 | 3.3 | 2.5 | 5.6 | 5.1 | 2.5 | 5.3 | 5.0 | 2.5 |
| O | 5.8 | 5.7 | 2.0 | 4.0 | 3.3 | 2.0 | 5.5 | 5.1 | 2.0 | ≥6 | 5.0 | 2.0 |
| P | | | | 3.8 | 3.3 | 2.0 | 5.4 | 5.1 | 2.0 | 5.7 | 5.0 | 2.0 |
| Q | 6.4 | 5.7 | 2.7 | 4.2 | 3.3 | 2.7 | 5.5 | 5.1 | 2.7 | 5.3 | 5.0 | 2.7 |
| R | 6.6 | 5.7 | <2 | 4.3 | 3.3 | <2 | 5.6 | 5.1 | <2 | | | |
| S | 6.4 | 5.7 | >3.5 | 4.3 | 3.3 | >3.5 | | | | 5.6 | 5.0 | >3.5 |
| T | 6.3 | 5.7 | 2.6 | 4.8 | 3.3 | 2.6 | 5.5 | 5.1 | 2.6 | 5.5 | 5.0 | 2.6 |
| U | 5.9 | 5.7 | 0 | 4.1 | 3.3 | 0 | 5.3 | 5.1 | 0 | 5.8 | 5.0 | 0 |
| V | | | | 4.5 | 3.3 | 3.0 | | | | 5.7 | 5.0 | 3.0 |
| W | 6.4 | 5.7 | 2.6 | 4.2 | 3.3 | 2.6 | | | | | | |
| X | | | | 4.2 | 3.3 | 0 | | | | 5.2 | 5.0 | 0 |
| Y | | | | 4.4 | 3.3 | 3.3 | 5.2 | 5.1 | 3.3 | 5.2 | 5.0 | 3.3 |
| Z | | | | 3.9 | 3.3 | 2.4 | | | | 5.7 | 5.0 | 4.2 |
| AA | | | | 4.5 | 3.3 | 0 | | | | ≥6 | 5.0 | 0 |
| BB | | | | 4.1 | 3.3 | 2.3 | | | | 5.6 | 5.0 | 2.3 |
| CC | | | | 4.4 | 3.3 | 2.3 | 5.2 | 5.1 | 2.3 | 6.0 | 5.0 | 2.3 |
| DD | | | | 4.3 | 3.3 | 3.0 | 5.5 | 5.1 | 3.0 | 5.6 | 5.0 | 3.0 |
| EE | 5.9 | 5.7 | <2 | >5 | 3.3 | <2 | 5.3 | 5.1 | <2 | 5.8 | 5.0 | <2 |
| FF | | | | 4.0 | 3.3 | <2 | | | | 5.5 | 5.0 | <2 |
| GG | | | | 4.2 | 3.3 | 2.6 | | | | 5.9 | 5.0 | 2.6 |
| HH | 6.0 | 5.7 | 2.8 | 4.2 | 3.3 | 2.8 | | | | 5.7 | 5.0 | 2.8 |
| II | | | | 4.4 | 3.3 | 2.5 | | | | 5.4 | 5.0 | 2.5 |
| JJ | 6.0 | 5.7 | 0 | 4.3 | 3.3 | 0 | | | | | | |
| KK | 6.2 | 5.7 | 0 | 4.2 | 3.3 | 0 | | | | | | |

[1] I=Insect-poison; J.H.=Hormone-compound.

EXAMPLE 87

By utilizing the procedure of Example 82, the following results were obtained:

TABLE 7.—FLIES
LD$_{50}$ concentration based on insect-poison]

| | Insect-poison (I:J.H.) | | | | | | | | | | | |
|---|---|---|---|---|---|---|---|---|---|---|---|---|
| | Sevin | | | Methoxychlor | | | Malathion | | | Allethrin | | |
| J.H. | 1:5 | 100:0 | 0:100 | 1:5 | 100:0 | 0:100 | 1:5 | 100:0 | 0:100 | 1:5 | 100:0 | 0:100 |
| K | | | | >5 | 3.8 | <2 | | | | | | |
| L | 4.5 | 2.5 | <2 | 4.4 | 3.8 | <2 | | | | 5.6 | 5.5 | <2 |
| M | 4.6 | 2.5 | 3.0 | 4.6 | 3.8 | 3.0 | 5.4 | 5.1 | 3.0 | | | |
| N | 4.3 | 2.5 | <2 | 4.4 | 3.8 | <2 | | | | | | |
| O | 3.5 | 2.5 | <2 | 4.2 | 3.8 | <2 | | | | | | |
| P | 4.3 | 2.5 | <2 | 4.2 | 3.8 | <2 | | | | | | |
| Q | 3.9 | 2.5 | <2 | 4.1 | 3.8 | <2 | | | | 5.6 | 5.5 | <2 |
| R | 4.2 | 2.5 | <2 | 4.4 | 3.8 | <2 | | | | | | |
| S | >5 | 2.5 | >3.5 | 4.6 | 3.8 | >3.5 | 5.3 | 5.1 | >3.5 | | | |
| T | 4.6 | 2.5 | 2.0 | 4.5 | 3.8 | 2.0 | 5.3 | 5.1 | 2.0 | | | |
| U | 4.6 | 2.5 | 0 | 4.5 | 3.8 | 0 | 5.4 | 5.1 | 0 | | | |
| V | >5 | 2.5 | >3.5 | 4.6 | 3.8 | >3.5 | 5.5 | 5.1 | >3.5 | | | |
| W | 4.6 | 2.5 | <2.6 | 4.5 | 3.8 | <2.6 | | | | | | |
| X | 4.5 | 2.5 | >3.5 | 4.5 | 3.8 | >3.5 | 5.2 | 5.1 | >3.5 | 5.6 | 5.5 | >3.5 |
| Y | >5 | 2.5 | 3.3 | 4.5 | 3.8 | 3.3 | 5.5 | 5.1 | 3.3 | 5.6 | 5.5 | 3.3 |
| Z | 4.2 | 2.5 | 3.5 | 4.1 | 3.8 | 3.5 | 5.2 | 5.1 | 3.5 | | | |
| AA | >5 | 2.5 | 0 | 4.4 | 3.8 | 0 | 5.5 | 5.1 | 0 | | | |
| BB | 3.7 | 2.5 | <2 | 4.2 | 3.8 | <2 | | | | | | |
| CC | 4.1 | 2.5 | <2 | 4.2 | 3.8 | <2 | | | | | | |
| DD | 5.0 | 2.5 | <2 | 4.5 | 3.8 | <2 | | | | 5.6 | 5.5 | <2 |
| EE | 3.8 | 2.5 | <2 | 4.3 | 3.8 | <2 | | | | | | |
| FF | 3.2 | 2.5 | <2 | 4.2 | 3.8 | <2 | | | | | | |
| GG | 4.2 | 2.5 | <2 | 4.3 | 3.8 | <2 | 5.4 | 5.1 | <2 | | | |
| HH | 4.2 | 2.5 | <2 | 4.2 | 3.8 | <2 | | | | | | |
| II | 3.6 | 2.5 | <2 | 4.3 | 3.8 | <2 | | | | | | |
| JJ | 3.8 | 2.5 | 0 | 4.2 | 3.8 | 0 | | | | | | |
| KK | 4.8 | 2.5 | 0 | 4.4 | 3.8 | 0 | | | | | | |

[1] I=Insect-poison; J.H.=Hormone-compound.

EXAMPLE 88

By utilizing the procedure of Example 84, the following results were obtained:

6-(allyloxy)-2,3-epoxy-2-methylheptane; and 1-(allyloxy)-10,11-epoxy-3,7,11-trimethyl-2,6-dodecadiene.

TABLE 8.—SPIDER MITES

[LD$_{50}$ concentration based on insect-poison]

| | Insect-poison (I.J.H.) | | | | | | | | | | | |
|---|---|---|---|---|---|---|---|---|---|---|---|---|
| | Sevin | | | Methoxychlor | | | Malathion | | | Allethrin | | |
| | 1:5 | 0:100 | 0:100 | 1:5 | 100:0 | 0:100 | 1:5 | 100:0 | 0:100 | 1:5 | 100:0 | 0:100 |
| J.H. | A O | A O | A O | A O | A O | A O | A O | A O | A O | A O | A O | A O |
| K | | | | | | | | | | 3.4 <3 | | |
| L | 4.1 | <3 | 3.3 | | | | 4.4 | <4 | 3.3 | | | |
| M | | | | | | | 4.6 | <4 | <2 | 3.6 | 3.4 | <2 |
| N | 3.4 3.5 | <3 <3 | <2 <2 | 3.7 3.6 | <3 <3 | <2 <2 | 4.1 | <4 | <2 | 4.0 | 3.4 | <2 |
| O | 3.1 | <3 | <2 | | | | | | | | | |
| P | 3.3 3.2 | <3 <3 | <2 <2 | 3.5 3.1 | <3 <3 | <2 <2 | | | | | | |
| Q | 3.5 3.3 | <3 <3 | <2 <2 | 3.5 3.4 | <3 <3 | <2 <2 | | | | 4.0 3.9 | 3.4 <3 | <2 <2 |
| R | 3.3 3.2 | <3 <3 | <2 <2 | | | | 4.1 | <4 | <2 | | 3.4 | <3 |
| S | 3.3 | <3 | <2 | 3.3 | <3 | <2 | | | | 3.9 3.1 | 3.4 <3 | <2 <2 |
| T | 4.6 5.1 | <3 <3 | <2 <2 | 4.1 4.0 | <3 <3 | <2 <2 | 5.2 4.7 | <4 <4 | <2 <2 | 4.7 4.7 | 3.4 <3 | <2 <2 |
| U | 3.1 | <3 | <2 | 3.1 | <3 | 0 | | | | | | |
| V | 3.1 | <3 | <2 | | | | | | | | | |
| W | 3.1 | <3 | <2 | | | | | | | | | |
| X | 3.9 3.5 | <3 <3 | 2.5 <2 | | | | | | | | | |
| Y | 3.9 3.5 | <3 <3 | 3.0 2.7 | 3.7 3.7 | <3 <3 | 3.0 2.7 | 4.7 | <4 | 3.0 | 4.3 4.1 | 3.4 <3 | 3.0 2.7 |
| Z | 3.6 | <3 | 2.0 | | | | | | | | | |
| AA | 3.9 3.3 | <3 <3 | 0 0 | 3.9 3.6 | <3 <3 | 0 0 | 4.7 4.2 | <4 <4 | 0 0 | 4.0 4.0 | 3.4 <3 | 0 0 |
| BB | | | | | | | | | | 3.6 3.4 | 3.4 <3 | <2 <2 |
| CC | | | | | | | | | | 3.7 3.2 | 3.4 <3 | <2 <2 |
| DD | 3.6 3.3 | <3 <3 | 3.0 3.0 | 3.7 3.5 | <3 <3 | 3.0 3.0 | | | | 4.0 4.0 | 3.4 <3 | 3.0 3.0 |
| EE | 4.0 3.5 | <3 <3 | 3.3 3.3 | 3.3 4.1 | <3 <3 | 3.3 3.3 | | | | 3.7 | 3.4 | 3.3 |
| FF | 3.9 3.3 | <3 <3 | 2.0 <2 | 3.1 3.4 | <3 <3 | 2.0 <2 | | | | | | |
| GG | 3.5 3.1 | <3 <3 | <2 <2 | | | | | | | | | |
| HH | 3.5 | <3 | <2 | | | | | | | 3.7 | 3.4 | <2 |
| II | 3.7 3.3 | <3 <3 | <2 <2 | 3.1 3.3 | <3 <3 | <2 <2 | | | | | | |
| JJ | 3.3 3.2 | <3 <3 | 0 0 | 3.2 | <3 | 0 | | | | | | |
| KK | 3.8 3.2 | <3 <3 | 0 0 | 3.1 3.1 | <3 <3 | 0 0 | | | | | | |

What is claimed is:

1. An insecticide composition useful for combatting aphids and flies, comprising an insecticidally effective amount of between 1 and 10 parts by weight of a pyrethrin; and an amount, effective for enhancing the insecticidal activity of said pyrethrin, of between 1 and 10 parts by weight of a hormone-compound selected from the group consisting of:
   10,11-epoxy-7-ethyl-3,11-dimethyl-trideca-2,6-dienoic acid methyl ester;
   10,11-epoxy-3,7,11-trimethyl-dodeca-2,6-dienyl ethyl ether;
   10,11-epoxy-3,7,11-trimethyl-dodeca-2,6-dienoic acid ethyl ester;
   10,11-epoxy-3,7,10,11-tetramethyl-dodeca-2,6-dienoic acid ethyl ester;
   10,11-epoxy-3,7,11-trimethyl-trideca-2,6-dienoic acid ethyl ester;
   6,7-epoxy-3,7-dimethyl-1-(2-propynyloxy)-oct-2-ene;
   10,11-epoxy-7-ethyl-3,7-dimethyl-trideca-2,6-dienoic acid ethyl ester;
   (10,11-epoxy-3,7,11-trimethyl-2,6-dodeca-dienyl)-methylether;
   p-[(4,5-epoxy-1,5-dimethylhexyl)oxy]benzoic acid methyl ester;
   p-[(6,7-epoxy-3,7-dimethyl-2-octenyl)oxy]benzoic acid methyl ester;
   2-[(2-propynyloxy)methyl]-1,4-benzodioxane;
   6,7-epoxy-3,7-dimethyl-2-octenoic acid allyl ester;
   1-[(1,1-dimethylallyl)oxy]-6,7-epoxy-3,7-dimethyl-2-octene;

2. The composition of claim 1 wherein said hormone-compound is 10,11-epoxy-7-ethyl-3,11-dimethyl-trideca-2,6-dienoic acid methyl ester.

3. The composition of claim 1 wherein said hormone-compound is 10,11-epoxy-3,7,10,11-tetramethyl-2,6-dodecadienoic acid ethyl ester.

4. The composition of claim 1 wherein said hormone-compound is 6,7-epoxy-3,7-dimethyl-1-(2-propyloxy-2-octene.

5. The composition of claim 1 wherein said hormone-compound is 2-[(2-propynyloxy)methyl]-1,4-benzodioxane.

6. The composition of claim 1 wherein said pyrethrin is selected from the group consisting of pyrethrum, 2,2-dimethyl-3-(2-methylpropenyl)-cyclopropane - carboxylic acid 1-cyclohexane-1,2-dicarboximido-methyl ester and 2,2-dimethyl - 3 - (2 - methylpropenyl)-cyclopropanecarboxylic acid-5-benzyl-3-furyl-methyl ester.

7. The composition of claim 1 wherein said pyrethrin is Pyrethrum.

References Cited

UNITED STATES PATENTS

| 3,453,362 | 7/1969 | Cruickshank | 424—84 |
| 3,513,176 | 5/1970 | Andrews et al. | 260—348 |

VINCENT D. TURNER, Primary Examiner

U.S. Cl. X.R.

424—DIG 10, DIG 12, 200, 213, 219, 224, 274, 275, 278, 282, 300, 306, 308, 314, 339, 354; 117—138.5